(12) United States Patent
Disch et al.

(10) Patent No.: US 11,935,549 B2
(45) Date of Patent: *Mar. 19, 2024

(54) APPARATUS AND METHOD FOR ENCODING AN AUDIO SIGNAL USING AN OUTPUT INTERFACE FOR OUTPUTTING A PARAMETER CALCULATED FROM A COMPENSATION VALUE

(71) Applicant: Fraunhofer-Gesellschaft zur Foerderung der angewandten Forschung e.V., Munich (DE)

(72) Inventors: Sascha Disch, Fuerth (DE); Franz Reutelhuber, Erlangen (DE); Jan Büthe, Erlangen (DE); Markus Multrus, Nuremberg (DE); Bernd Edler, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,911

(22) Filed: Aug. 11, 2022

(65) Prior Publication Data

US 2022/0392465 A1 Dec. 8, 2022

Related U.S. Application Data

(63) Continuation of application No. 16/283,668, filed on Feb. 22, 2019, now Pat. No. 11,521,628, which is a
(Continued)

(30) Foreign Application Priority Data

Aug. 23, 2016 (EP) .................................. 16185398

(51) Int. Cl.
*G10L 19/02* (2013.01)
*G10L 19/008* (2013.01)
(Continued)

(52) U.S. Cl.
CPC .......... *G10L 19/02* (2013.01); *G10L 21/0232* (2013.01); *G10L 21/038* (2013.01);
(Continued)

(58) Field of Classification Search
CPC ........ G10L 19/04; G10L 19/008; G10L 19/16
(Continued)

(56) References Cited

U.S. PATENT DOCUMENTS 8,073,050 B2    12/2011   Suzuki et al.
8,751,225 B2    6/2014    Lee et al.
(Continued)

FOREIGN PATENT DOCUMENTS

CN    1524261 A    8/2004
CN    1707955 A    12/2005
(Continued)

OTHER PUBLICATIONS

Bartkowiak, Maciej, "Low Bit Rate Coding of Sparse Audio Spectra Using Frequency Shift and Interleaved MDCT", 15th European Signal Processing Conference (EUSIPCO 2007), Poznan, Poland, Sep. 3-7, 2007.
(Continued)

*Primary Examiner* — Farzad Kazeminezhad
(74) *Attorney, Agent, or Firm* — Perkins Coie LLP; Michael A. Glenn

(57) ABSTRACT

An apparatus for encoding an audio signal includes: a core encoder for core encoding first audio data in a first spectral band; a parametric coder for parametrically coding second audio data in a second spectral band being different from the first spectral band, wherein the parametric coder includes: an
(Continued)

analyzer for analyzing first audio data in the first spectral band to obtain a first analysis result and for analyzing second audio data in the second spectral band to obtain a second analysis result; a compensator for calculating a compensation value using the first analysis result and the second analysis result; and a parameter calculated for calculating a parameter from the second audio data in the second spectral band using the compensation value.

26 Claims, 14 Drawing Sheets

Related U.S. Application Data continuation of application No. PCT/EP2017/071048, filed on Aug. 21, 2017.

(51) Int. Cl.
    *G10L 19/04*      (2013.01)
    *G10L 19/16*      (2013.01)
    *G10L 21/0232*    (2013.01)
    *G10L 21/038*     (2013.01)
    *H04L 65/70*      (2022.01)

(52) U.S. Cl.
    CPC ............ *H04L 65/70* (2022.05); *G10L 19/008* (2013.01); *G10L 19/04* (2013.01); *G10L 19/16* (2013.01)

(58) Field of Classification Search
    USPC ........................................................ 704/500
    See application file for complete search history.

(56) References Cited

U.S. PATENT DOCUMENTS

| | | | | |
|---|---|---|---|---|
| 11,521,628 | B2* | 12/2022 | Disch .................. | G10L 19/02 |
| 2004/0196770 | A1 | 10/2004 | Touyama et al. | |
| 2005/0271367 | A1 | 12/2005 | Lee et al. | |
| 2008/0027733 | A1 | 1/2008 | Oshikiri et al. | |
| 2008/0219344 | A1 | 9/2008 | Suzuki et al. | |
| 2010/0292994 | A1 | 11/2010 | Lee et al. | |
| 2011/0119055 | A1 | 5/2011 | Lee et al. | |
| 2011/0280337 | A1 | 11/2011 | Lee et al. | |
| 2012/0065965 | A1 | 3/2012 | Choo et al. | |
| 2013/0060367 | A1 | 3/2013 | Disch et al. | |
| 2013/0179175 | A1 | 7/2013 | Biswas et al. | |
| 2014/0046672 | A1 | 2/2014 | Liu et al. | |
| 2014/0205101 | A1 | 7/2014 | Yamamoto et al. | |
| 2014/0229170 | A1 | 8/2014 | Atti et al. | |
| 2015/0287417 | A1 | 10/2015 | Disch et al. | |
| 2015/0332693 | A1 | 11/2015 | Dietz et al. | |
| 2015/0332702 | A1 | 11/2015 | Disch et al. | |
| 2016/0232912 | A1 | 8/2016 | Kjoerling et al. | |
| 2016/0345116 | A1 | 11/2016 | Yen et al. | |
| 2016/0372127 | A1 | 12/2016 | Chebiyyam et al. | |
| 2017/0133023 | A1 | 5/2017 | Disch et al. | |
| 2017/0256267 | A1 | 9/2017 | Disch et al. | |
| 2020/0408284 | A1 | 12/2020 | De Maziere et al. | |

FOREIGN PATENT DOCUMENTS

| | | |
|---|---|---|
| CN | 102150204 A | 8/2011 |
| CN | 104040623 A | 9/2014 |
| JP | 2005114814 A | 4/2005 |
| JP | 2010020251 A | 1/2010 |
| JP | 2013538374 A | 10/2013 |
| JP | 2019510950 A | 4/2019 |
| RU | 2591012 C2 | 7/2016 |
| TW | 201608560 A | 3/2016 |
| TW | 201610986 A | 3/2016 |
| WO | 2005111568 A1 | 11/2005 |
| WO | 2007093726 A2 | 8/2007 |
| WO | 2013027629 A1 | 2/2013 |
| WO | 2014118185 A1 | 8/2014 |
| WO | 2014123578 A1 | 8/2014 |
| WO | 2014161995 A1 | 10/2014 |

OTHER PUBLICATIONS

Liu, Chi-Min, et al., "Compression Artifacts in Perceptual Audio Coding", IEEE Transactions on Audio, Speech, and Language Processing vol. 16, No. 4, May 2008.

Sun, Ran, "The Research on Information Hiding in Variable-Bit-Rate", Chinese Excellent Doctoral and Master's Dissertations Full-text Database (Master's) Information Technology Series.

Wang, Jie, "The Research and DSP Realization on G.729 Voice Compression", Chinese Excellent Doctoral and Master's Dissertations Full-text Database (Master's) Information Technology Series.

* cited by examiner (COMPENSATION DETECTOR FUNCTIONALITY)

- "complex" TCX power spectrum P is available

- TCX power spectrum is not available gain factor is function of $E_{real}$

APPARATUS AND METHOD FOR ENCODING AN AUDIO SIGNAL USING AN OUTPUT INTERFACE FOR OUTPUTTING A PARAMETER CALCULATED FROM A COMPENSATION VALUE

CROSS-REFERENCES TO RELATED APPLICATIONS

This application is a continuation of copending U.S. application Ser. No. 16/283,668, filed Feb. 22, 2019, which is a continuation of International Application No. PCT/EP2017/071048, filed Aug. 21, 2017, which is incorporated herein by reference in its entirety, and additionally claims priority from European Application No. EP 16 185 398.1, filed Aug. 23, 2016, which is incorporated herein by reference in its entirety.

TECHNICAL FIELD

The present invention is directed to audio coding and decoding, and specifically to audio encoding/decoding using spectral enhancement technologies such as bandwidth extension or spectral band replication (SBR) or intelligent gap filling (IGF).

BACKGROUND OF THE INVENTION

Storage or transmission of audio signals is often subject to strict bitrate constraints. In the past, coders were forced to drastically reduce the transmitted audio bandwidth when only a very low bitrate was available. Modern audio codecs are nowadays able to code wide-band signals by using bandwidth extension (BWE) methods [1-2]. These algorithms rely on a parametric representation of the high-frequency content (HF)—which is generated from the waveform coded low-frequency part (LF) of the decoded signal by means of transposition into the HF spectral region ("patching") and application of a parameter driven post processing. However, if e.g. the spectral fine structure in a patch copied to some target region is vastly different from the spectral fine structure of the original content, annoying artefacts might result and degrade the perceptual quality of the decoded audio signal.

In BWE schemes, the reconstruction of the HF spectral region above a given so-called cross-over frequency is often based on spectral patching. Typically, the HF region is composed of multiple adjacent patches and each of these patches is sourced from bandpass (BP) regions of the LF spectrum below the given cross-over frequency. State-of-the-art systems efficiently perform the patching within a filterbank representation by copying a set of adjacent subband coefficients from a source to the target region. In a next step, the spectral envelope is adjusted such that it closely resembles the envelope of the original HF signal that has been measured in the encoder and transmitted in the bitstream as side information.

However, often a mismatch in spectral fine structure exists that might lead to the perception of artefacts. A commonly known mismatch is related to tonality. If the original HF includes a tone with rather dominant energy content and the patch to be copied to the spectral location of the tone has a noisy characteristic, this bandpass noise can be scaled up such that it becomes audible as an annoying noise burst.

Spectral band Replication (SBR) is a well-known BWE employed in contemporary audio codecs [1]. In SBR, the problem of tonality mismatch is addressed by insertion of artificial replacement sinusoids. However, this may involve additional side information to be transmitted to the decoder enlarging the bit demand of BWE data. Moreover, inserted tones can lead to instability over time if insertion of the tone toggles on/off for subsequent blocks.

Intelligent Gap Filling (IGF) denotes a semi-parametric coding technique within modern codecs like MPEG-H 3D Audio or the 3gpp EVS codec. IGF can be applied to fill spectral holes introduced by the quantization process in the encoder due to low-bitrate constraints. Typically, if the limited bit budget does not allow for transparent coding, spectral holes emerge in the high-frequency (HF) region of the signal first and increasingly affect the entire upper spectral range for lowest bitrates. At the decoder side, such spectral holes are substituted via IGF using synthetic HF content generated in a semi-parametric fashion out of low-frequency (LF) content, and post-processing controlled by additional parametric side information.

As IGF is fundamentally based on filling the high frequency spectrum by copying spectral parts (so-called tiles) from lower frequencies and adjusting the energies by applying a gain factor, it may prove problematic if in the original signal the frequency range used as the source of the copy-up process differs from its destination in terms of spectral fine structure.

One such case that can have a strong perceptual impact is a difference in tonality. This tonality mismatch can occur in two different ways: either a frequency range with strong tonality is copied to a spectral region that is supposed to be noise-like in structure, or the other way around with noise replacing a tonal component in the original signal. In IGF the former case—which is more common as most audio signals usually become more noise-like toward higher frequencies—is handled by the application of spectral whitening where parameters are transmitted to the decoder that signal how much whitening may be used, if any at all. For the latter case, tonality could be corrected by using the full band encoding capability of the core coder to preserve tonal lines in the HF band through waveform coding. These so-called "surviving lines" could be selected based on strong tonality. Waveform coding is quite demanding in terms of bitrate and in low bitrate scenarios it is most likely one cannot afford it. Moreover, toggling from frame to frame between coding and not coding a tonal component which would cause annoying artifacts has to be prevented.

The intelligent gap filling technology is additionally disclosed and described in the European patent application EP 2830054 A1. The IGF technology addresses the problems related to the separation of bandwidth extension on the one hand and core decoding on the other hand by performing the bandwidth extension in the same spectral domain in which the core decoder operates. Therefore, a full rate core encoder/decoder is provided, which encodes and decodes the full audio signal range. This does not require the need for a down sampler on the encoder side and an upsampler on the decoder side. Instead, the whole processing is performed in the full sampling rate or full bandwidth domain. In order to obtain a high coding gain, the audio signal is analyzed in order to find the first set of first spectral portions which has to be encoded with a high resolution, where this first set of first spectral portions may include, in an embodiment, tonal portions of the audio signal. On the other hand, non-tonal or noisy components in the audio signal constituting a second set of second spectral portions are parametrically encoded with low spectral resolution. The encoded audio signal then only may use the first set of first spectral portions encoded in the waveform-preserving manner with a high spectral resolution, and additionally the second set of second spectral portions encoded parametrically with a low resolution using frequency "tiles" sourced from the first set. On the decoder side, the core decoder, which is a full band decoder, reconstructs the first set of first spectral portions in a waveform-preserving manner, i.e. without any knowledge that there is any additional frequency regeneration. However, the such generated spectrum has a lot of spectral gaps. These gaps are subsequently filled with the inventive intelligent gap filling (IGF) technology by using a frequency regeneration applying parametric data on the one hand and using a source spectral range, i.e. first spectral portions reconstructed by the full rate audio decoder on the other hand.

The IGF technology is also included and disclosed in 3GPP TS 26.445 V13.2.0 (2016 June), Third Generation Partnership Project; Technical Specification Group Services and System Aspect; Codec for Enhanced Voice Services (EVS); Detailed Algorithmic Description (release 13). In particular, reference is made to section 5.3.3.2.11 "Intelligent Gap Filling" of this reference regarding an encoder-side, and additional reference is made to section 6 and in particular section 6.2.2.3.8 "IGF Apply" and other IGF related passages, such as section 6.2.2.2.9 "IGF Bitstream Reader" or section 6.2.2.3.11 "IGF Temporal Flattening" with respect to the decoder-side implementation.

EP 2301027 B1 discloses an apparatus and a method for generating bandwidth extension output data. In voiced speech signals, a lowering of the calculated noise floor yields a perceptually higher quality when compared to the original calculated noise floor. As a result speech sounds less reverberant in this case. In case the audio signals comprise sibilants an artificial increase of the noise floor may cover up drawbacks in the patching method related to sibilants. Hence, the reference discloses providing a decrease of the noise floor for signals such as voiced speech and an increase of the noise floor for signals comprising, e.g. sibilants. To distinguish the different signals, embodiments use energy distribution data (e.g. a sibilance parameter) that measures whether the energy is mostly located at higher frequencies or higher frequency, or in other words whether the spectral representation of the audio signal shows an increasing or decreasing tilt towards higher frequencies. Further implementations also use the first LPC coefficient (LPC equal to linear predictive coding) to generate the sibilance parameter.

SUMMARY

According to an embodiment, an apparatus for encoding an audio signal may have: a core encoder for core encoding first audio data in a first spectral band; a parametric coder for parametrically coding second audio data in a second spectral band being different from the first spectral band, wherein the parametric coder has: an analyzer for analyzing the first audio data in the first spectral band to obtain a first analysis result and for analyzing the second audio data in the second spectral band to obtain a second analysis result; a compensator for calculating a compensation value using the first analysis result and the second analysis result; and a parameter calculator for calculating a parameter from the second audio data in the second spectral band using the compensation value.

According to another embodiment, a method of encoding an audio signal may have the steps of: core encoding first audio data in a first spectral band; parametrically coding second audio data in a second spectral band being different from the first spectral band, wherein the parametrically coding has: analyzing the first audio data in the first spectral band to obtain a first analysis result and analyzing the second audio data in the second spectral band to obtain a second analysis result; calculating a compensation value using the first analysis result and the second analysis result; and calculating a parameter from the second audio data in the second spectral band using the compensation value, wherein the analyzing has calculating a tonal-to-noise ratio of the second audio data in the second spectral band, and wherein the calculating the compensation value has calculating the compensation value dependent on the tonal-to-noise ratio of the second audio data so that a first compensation value is obtained for a first tonal-to-noise ratio or a second compensation value is obtained for a second tonal-to-noise ratio, the first compensation value being greater than the second compensation value, and the first tonal-to-noise ratio being greater than the second tonal-to-noise ratio.

According to another embodiment, a system for processing an audio signal may have: an inventive apparatus for encoding an audio signal as mentioned above; and a decoder for receiving an encoded audio signal having encoded first audio data in the first spectral band and a parameter representing second audio data in the second spectral band, wherein the decoder is configured for performing a spectral enhancement operation in order to regenerate synthesized audio data for the second spectral band using the parameter and decoded first audio data in the first spectral band.

According to another embodiment, a method of processing an audio signal may have the steps of: encoding an audio signal in accordance with the inventive method of encoding an audio signal as mentioned above; and receiving an encoded audio signal having encoded first audio data in the first spectral band and a parameter representing second audio data in the second spectral band; and performing a spectral enhancement operation in order to regenerate synthesized audio data for the second spectral band using the parameter and decoded first audio data in the first spectral band.

Still another embodiment may have a non-transitory digital storage medium having computer-readable code stored thereon to perform a method of encoding an audio signal, having: core encoding first audio data in a first spectral band; parametrically coding second audio data in a second spectral band being different from the first spectral band, wherein the parametrically coding has: analyzing the first audio data in the first spectral band to obtain a first analysis result and analyzing the second audio data in the second spectral band to obtain a second analysis result; calculating a compensation value using the first analysis result and the second analysis result; and calculating a parameter from the second audio data in the second spectral band using the compensation value, wherein the analyzing has calculating a tonal-to-noise ratio of the second audio data in the second spectral band, and wherein the calculating the compensation value has calculating the compensation value dependent on the tonal-to-noise ratio of the second audio data so that a first compensation value is obtained for a first tonal-to-noise ratio or a second compensation value is obtained for a second tonal-to-noise ratio, the first compensation value being greater than the second compensation value, and the first tonal-to-noise ratio being greater than the second tonal-to-noise ratio, when the computer-readable code is run by a computer.

Another embodiment may have a non-transitory digital storage medium having computer-readable code stored thereon to perform a method of processing an audio signal, having: encoding an audio signal, having: core encoding first audio data in a first spectral band; parametrically coding second audio data in a second spectral band being different from the first spectral band, wherein the parametrically coding has: analyzing the first audio data in the first spectral band to obtain a first analysis result and analyzing the second audio data in the second spectral band to obtain a second analysis result; calculating a compensation value using the first analysis result and the second analysis result; and calculating a parameter from the second audio data in the second spectral band using the compensation value, wherein the analyzing has calculating a tonal-to-noise ratio of the second audio data in the second spectral band, and wherein the calculating the compensation value has calculating the compensation value dependent on the tonal-to-noise ratio of the second audio data so that a first compensation value is obtained for a first tonal-to-noise ratio or a second compensation value is obtained for a second tonal-to-noise ratio, the first compensation value being greater than the second compensation value, and the first tonal-to-noise ratio being greater than the second tonal-to-noise ratio; receiving an encoded audio signal having encoded first audio data in the first spectral band and a parameter representing second audio data in the second spectral band; and performing a spectral enhancement operation in order to regenerate synthesized audio data for the second spectral band using the parameter and decoded first audio data in the first spectral band, when the computer-readable code is run by a computer.

An apparatus for encoding an audio signal comprises a core encoder for core encoding first audio data in a first spectral band and a parametric coder for parametrically coding second audio data in a second spectral band being different from the first spectral band. In particular, the parametric coder comprises an analyzer for analyzing first audio data in the first spectral band to obtain a first analysis result and for analyzing second audio data in the second spectral band to obtain a second analysis result. A compensator calculates a compensation value using the first analysis result and the second analysis result. Furthermore, a parameter calculator then calculates a parameter from the second audio data in the second spectral band using the compensation value as determined by the compensator.

Thus, the present invention is based on the finding that in order to find out whether a reconstruction using a certain parameter on the decoder side addresses a certain characteristic that may be used by the audio signal, the first spectral band, which is typically the source band, is analyzed to obtain the first analysis result. Analogously, the second spectral band, which is typically the target band, and which is reconstructed on the decoder-side using the first spectral band, i.e. the source band, is additionally analyzed by the analyzer to obtain the second analysis result. Thus, for the source band as well as the target band, a separate analysis result is calculated.

Then, based on these two analysis results, a compensator calculates a compensation value for changing a certain parameter which would have been obtained without any compensation to a modified value. In other words, the present invention departs from the typical procedure, in which a parameter for the second spectral band is calculated from the original audio signal and is transmitted to the decoder so that the second spectral band is reconstructed using the calculated parameter, and instead results in a compensated parameter calculated from the target band on the one hand and the compensation value which depends on both the first and the second analysis results on the other hand.

The compensated parameter can be calculated by firstly calculating the non-compensated parameter and then this non-compensated parameter can be combined with the compensation value to obtain the compensated parameter, or the compensated parameter can be calculated in one shot, without the uncompensated parameter as an intermediate result. The compensated parameter can then be transmitted from the encoder to the decoder, and then the decoder applies a certain bandwidth enhancement technology such as spectral band replication or intelligent gap filling or any other procedure using the compensated parameter value. Thus, the strong obedience to a certain parameter calculation algorithm irrespective of whether the parameter results in a desired spectral band enhancement result is flexibly overcome by performing, in addition to the parameter calculation, the signal analysis in the source band and the target band and the subsequent calculation of a compensation value based on the result from the source band and the result from the target band, i.e. from the first spectral band and the second spectral band, respectively.

Advantageously, the analyzer and/or the compensator apply a kind of psychoacoustic model determining a psychoacoustic mismatch. Hence, in an embodiment, the calculation of the compensation value is based on the detection of a psychoacoustic mismatch of certain signal parameters such as tonality and a compensation strategy is applied to minimize overall perceptual annoyance through modification of other signal parameters such as spectral band gain factors. Thus, by trading off different types of artifacts, a perceptually well-balanced result is obtained.

As opposed to prior-art approaches "that try to fix tonality at any cost", embodiments teach to rather remedy artefacts through application of a damping of problematic parts of the spectrum where a tonality mismatch is detected, thereby trading off a spectral energy envelope mismatch against a tonality mismatch.

On input of several signal parameters, the compensation strategy containing a perceptual annoyance model can decide on a strategy for obtaining a best perceptual fit rather than a mere signal parameter fit.

The strategy consists of weighing the perceptual significance of potential artefacts and choosing a parameter combination to minimize the overall impairment.

This approach is mainly intended to be applied within a BWE based on a transform like the MDCT. Nevertheless, the teachings of the invention are generally applicable, e.g. analogously within a Quadrature Mirror Filter bank (QMF) based system.

One possible scenario in which this technique may be applied is the detection and subsequent damping of noise bands in the context of Intelligent Gap Filling (IGF).

Embodiments handle a possible tonality mismatch through detecting its occurrence and reducing its effect by attenuating the corresponding scaling factor. This may on one hand lead to a deviation from the original's spectral energy envelope, but on the other hand to a reduction of HF noisiness which contributes to an overall increase in perceptual quality.

Thus, embodiments improve the perceptual quality through a novel parametric compensation technique, typically steered by a perceptual annoyance model, particularly in cases where, for example, a mismatch in spectral fine structure between the source or first spectral band and the target or second spectral band exists.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
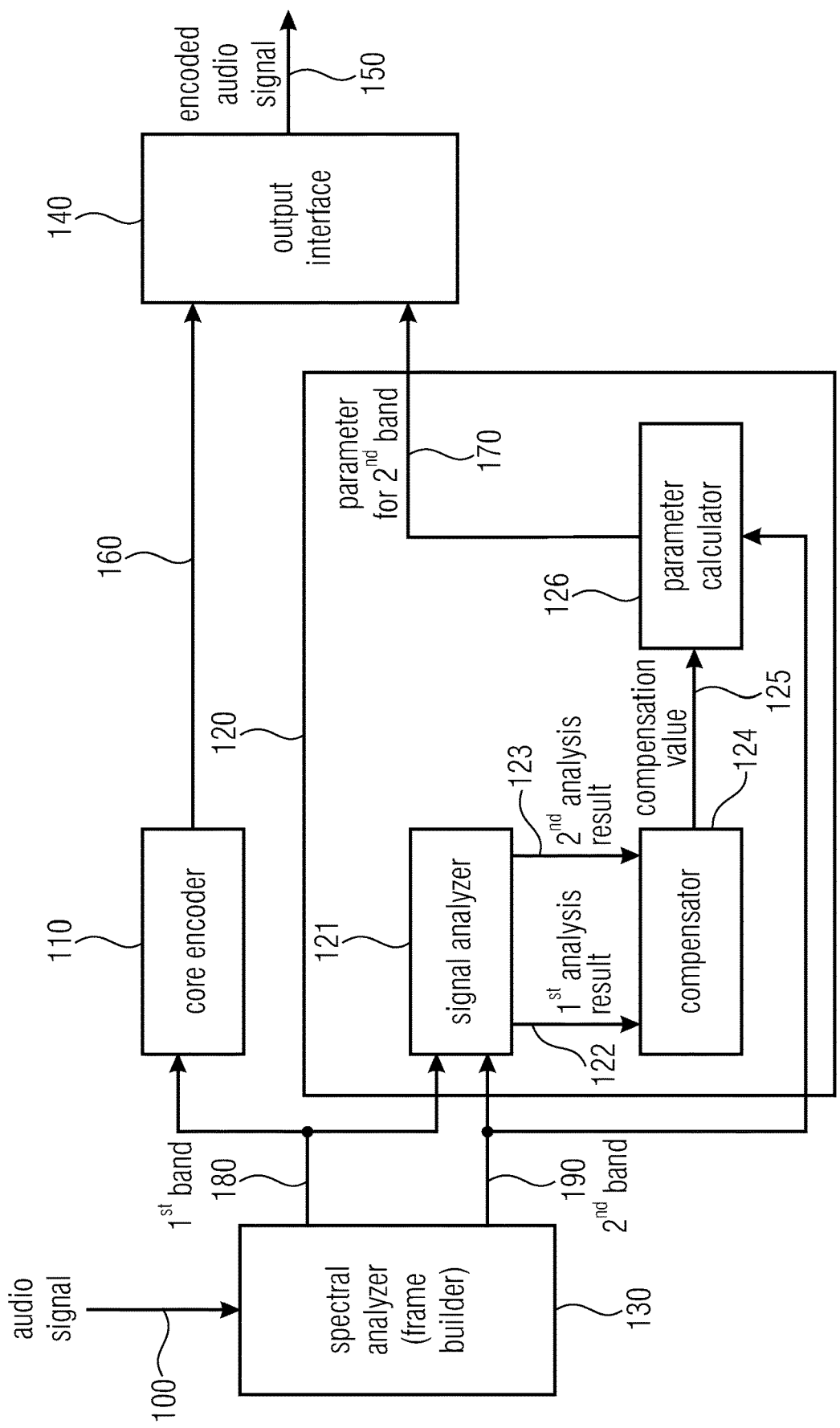
FIG. 1 illustrates a block diagram of an apparatus for encoding an audio signal in accordance with an embodiment.

FIG. 1 illustrates an apparatus for encoding an audio signal 100 in an embodiment of the present invention. The apparatus comprises a core encoder 110 and a parametric coder 120. Furthermore, the core encoder 110 and the parametric coder 120 are connected, on their input-side, to a spectral analyzer 130 and are connected, at their output side, to an output interface 140. The output interface 140 generates an encoded audio signal 150. The output interface 140 receives, on the one hand, an encoded core signal 160 and at least a parameter for the second spectral band and typically a full parameter representation comprising the parameter for a second spectral band at input line 170. Furthermore, the spectral analyzer 130 separates the audio signal 100 into a first spectral band 180 and a second spectral band 190. In particular, the parameter calculator comprises an analyzer 121 which is illustrated as a signal analyzer in FIG. 1 for analyzing first audio data in the first spectral band 180 to obtain a first analysis result 122 and for analyzing second audio data in the second spectral band 190 for obtaining a second analysis result 123. Both the first analysis result 122 and the second analysis result 123 are provided to a compensator 124 for calculating a compensation value 125. Thus, the compensator 124 is configured for using the first analysis result 122 and the second analysis result 123 for calculating the compensation value. Then, the compensation value 125 on the one hand and at least the second audio data from the second spectral band 190 (the first spectral data from the first spectral band may be used as well) are both provided to a parameter calculator 126 for calculating a parameter 170 from the second audio data in the second spectral band using the compensation value 125.

The spectral analyzer 130 in FIG. 1 can be, for example, a straightforward time/frequency converter to obtain individual spectral bands or MDCT lines. In this implementation, therefore, the spectral analyzer 130 implements a modified discrete cosine transform (MDCT) to obtain spectral data. Then, this spectral data is further analyzed in order to separate data for the core encoder 110 on the one hand and data for the parametric coder 120 on the other hand. Data for the core encoder 110 at least comprise the first spectral band. Furthermore, the core data may additionally comprise further source data when the core encoder is to encode more than one source band.

Thus, the core encoder may receive, as input data to be core encoded, the whole bandwidth below a cross-over frequency in the case of spectral band replication technologies, while the parametric coder then receives all audio data above this cross-over frequency.

In the case of an intelligent gap filling framework, however, the core encoder 110 may additionally receive spectral lines above an IGF start frequency which are also analyzed by the spectral analyzer 130 so that the spectral analyzer 130 additionally determines data even above the IGF start frequency where this data above the IGF start frequency is additionally encoded by the core encoder. To this end, the spectral analyzer 130 may also be implemented as a "tonal mask" which is, for example, also discussed in section 5.3.3.2.11.5 "IGF Tonal Mask" as disclosed in 3GPP TS 26.445 V13.0.0(12). Thus, in order to determine which spectral component should be transmitted with the core encoder, the tonal mask is calculated by the spectral analyzer 130. Therefore, all significant spectral content is identified, whereas content that is well-suited for parametric coding through IGF is quantized to zero by the tonal mask. The spectral analyzer 130 nevertheless forwards the spectral content that is well-suited for parametric coding to the parametric coder 120, and this data may for example be the data that has been set to zero by the tonal mask processing.

Figure 2:
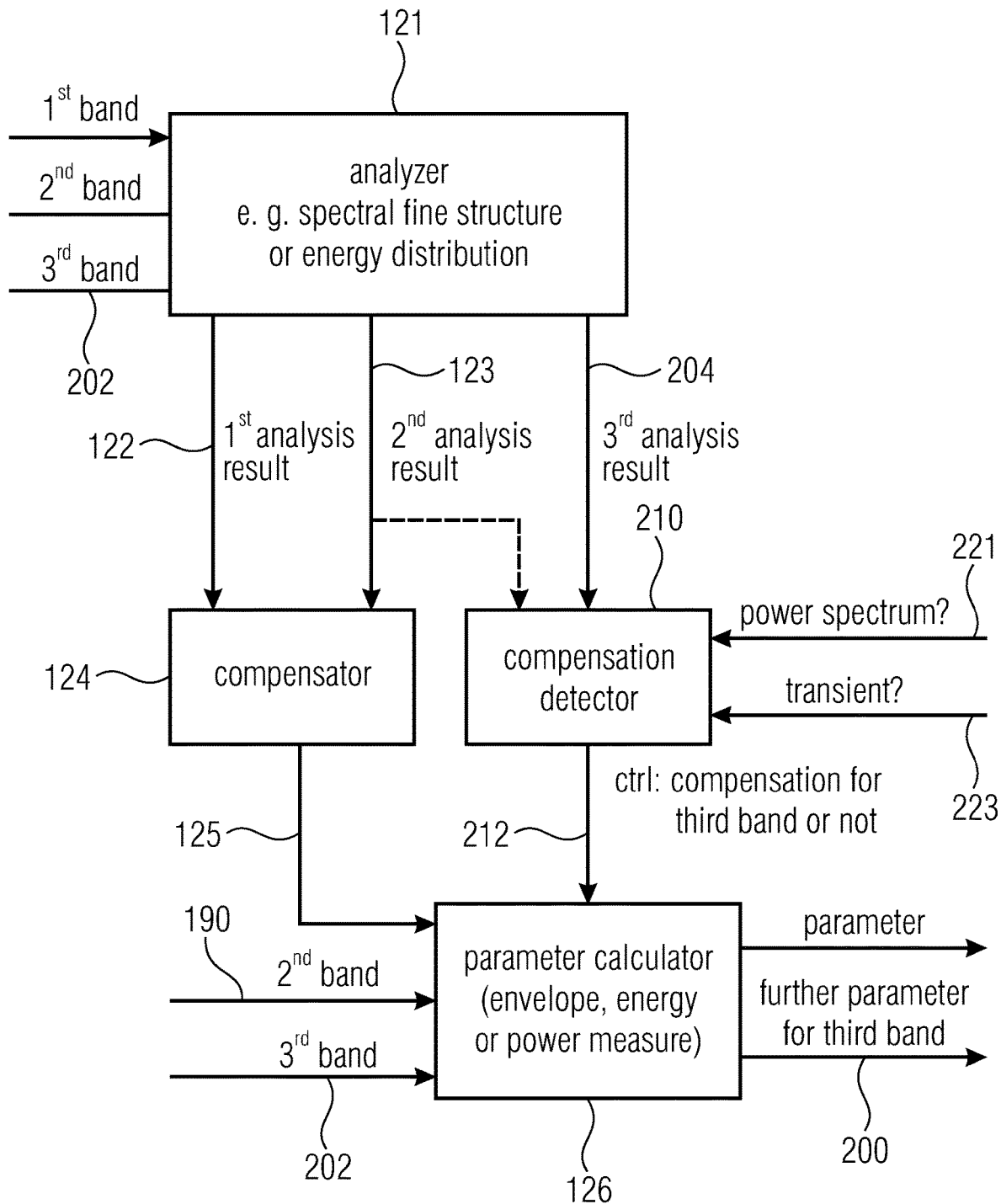
FIG. 2 illustrates a block diagram of an apparatus for encoding with a focus on the compensation detector.

In an embodiment, illustrated in FIG. 2, the parametric coder 120 is additionally configured for parametrically coding third audio data in a third spectral band to obtain a further parameter 200 for this third spectral band. In this case, the analyzer 121 is configured for analyzing the third audio data in the third spectral band 202 to obtain a third analysis result 204 in addition to the first analysis result 122 and the second analysis result 123.

Furthermore, the parametric coder 120 from FIG. 1 additionally comprises a compensation detector 210 for detecting, using at least the third analysis result 204, whether the third spectral band is to be compensated or not. The result of this detection is output by a control line 212 which either indicates a compensation situation for the third spectral band or not. The parameter calculator 126 is configured to calculate the further parameter 200 for the third spectral band without any compensation value, when the compensation detector detects the third spectral band is not to be compensated as provided by the control line 212. However, if the compensation detector detects that the third spectral band is to be compensated, then the parameter calculator is configured to calculate the further parameter 200 for the third spectral band with an additional compensation value calculated by the compensator 124 from the third analysis result 200.

In an embodiment, where a quantitative compensation is applied, the analyzer 121 is configured to calculate, as the first analysis result, a first quantitative value 122 and as the second analysis result a second quantitative value 123. Then, the compensator 124 is configured to calculate a quantitative compensation value 125 from the first quantitative value and from the second quantitative value. Finally, the parameter calculator is configured for calculating the quantitative parameter using the quantitative compensation value.

However, the present invention is also applicable when only qualitative analysis results are obtained. In this situation, a qualitative compensation value is calculated which then controls the parameter calculator to lower or increase a certain non-compensated parameter by a certain degree. Thus, both analysis results together may result in a certain increase or decrease of a parameter, the certain increase or decrease is fixed and is therefore not dependent on any quantitative result. However, quantitative results may be used over a fixed increase/decrease increments, although the latter calculations are less computationally intensive.

Advantageously, the signal analyzer 121 analyzes a first characteristic of the audio data to obtain the first analysis result and additionally analyzes the same first characteristic of the second audio data in the second spectral band to obtain the second analysis result. Contrary thereto, the parameter calculator is configured for calculating the parameter from the second audio data in the second spectral band by evaluating a second characteristic where this second characteristic is different from this first characteristic.

Exemplarily, FIG. 2 illustrates the situation where the first characteristic is a spectral fine structure or an energy distribution within a certain band such as the first, the second or any other band. Contrary thereto, the second characteristic applied by the parameter calculator or determined by the parameter calculator is a spectral envelope measure, an energy measure or a power measure or generally an amplitude-related measure giving an absolute or relative measure of the power/energy in a band such as, for example, a gain factor. However, other parameters which measure a different characteristic from a gain factor characteristic can be calculated by the parameter calculator as well. Furthermore, other characteristics for the individual source band on the one hand and the destination band on the other hand, i.e. the first spectral band and the second spectral band respectively, can be applied and analyzed by the analyzer 121.

Furthermore, the analyzer 121 is configured to calculate the first analysis result 122 without using the second audio data in the second spectral band 190 and to additionally calculate the second analysis result 123 without using the first audio data in the first spectral band 180 where, in this embodiment, the first spectral band and the second spectral band are mutually exclusive to each other, i.e. do not overlap with each other.

Furthermore, the spectral analyzer 130 is additionally configured to build frames of the audio signal or to window an incoming stream of audio samples to obtain frames of audio samples, where the audio samples in neighboring frames are overlapping with each other. In case of a 50% overlap, for example, a second portion of an earlier frame has audio samples that are derived from the same original audio samples included in the first half of the subsequent frame, where the audio samples within a frame are derived from the original audio samples by windowing.

In this case, when the audio signal comprises a time sequence of frames as, for example, additionally provided by the block 130 of FIG. 1 additionally having a frame builder functionality, the compensator 124 is configured to calculate a current compensation value for a current frame using a previous compensation frame value for a previous frame. This typically results in a kind of a smoothing operation.

As outlined later on, the compensation detector 210 illustrated in FIG. 2 may additionally or alternatively from other features in FIG. 2 comprise a power spectrum input and a transient input illustrated at 221, 223, respectively.

In particular, the compensation detector 210 is configured to only instruct a compensation to be used by the parameter calculator 126, when a power spectrum of the original audio signal 100 of FIG. 1 is available. This fact, i.e. whether or not the power spectrum is available, is signaled by a certain data element or flag.

Furthermore, the compensation detector 210 is configured to only allow a compensation operation via the control line 212, when a transient information line 223 signals that, for the current frame, a transient is not present. Thus, when line 223 signals that a transient is present, the whole compensation operation is disabled irrespective of any analysis results. This of course applies for the third spectral band, when a compensation has been signaled for the second spectral band. However, this also applies for the second spectral band in a certain frame, when for this frame a situation such as a transient situation is detected. Then, the situation can occur and will occur that, for a certain time frame, any parameter compensation does not take place at all.

Figure 3A:
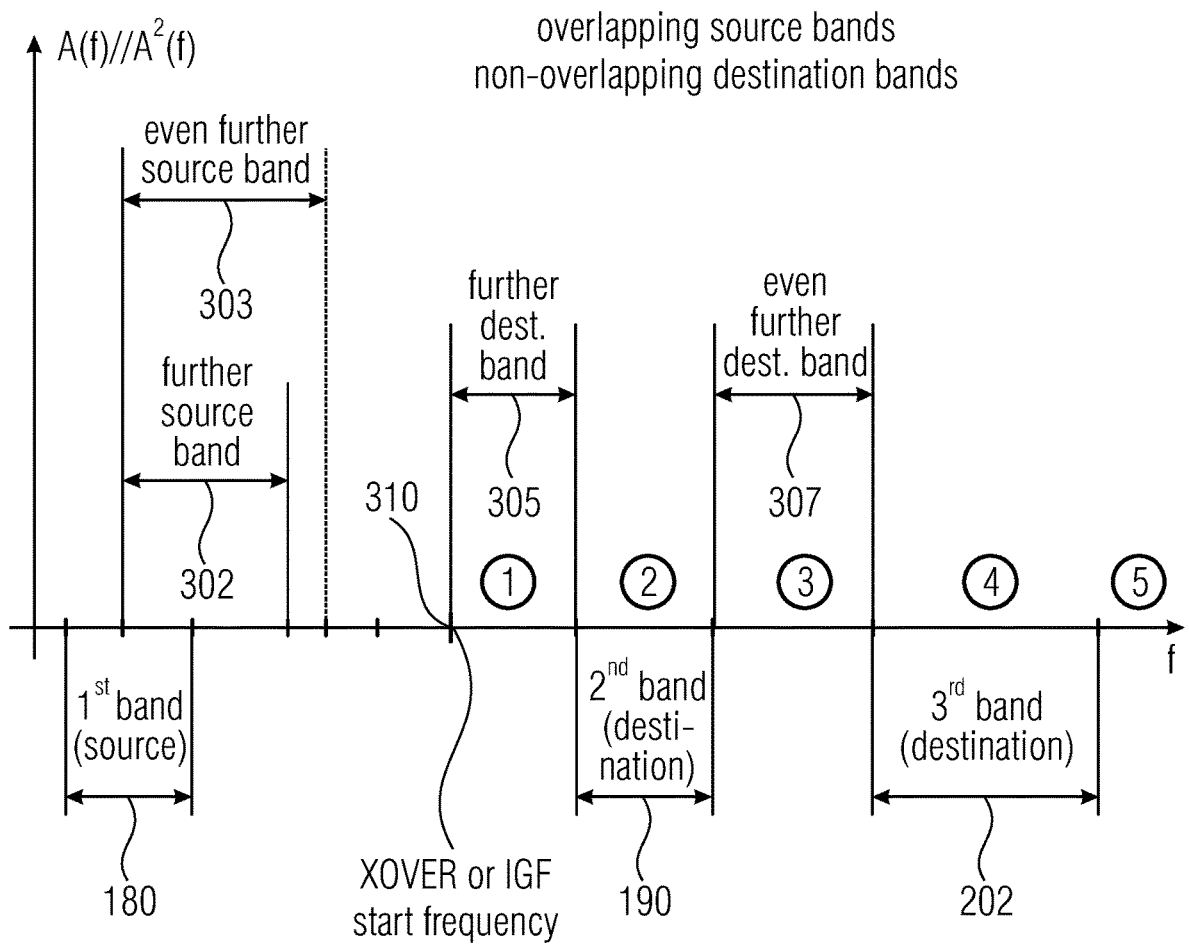
FIG. 3*a* illustrates a schematic representation of an audio spectrum having a source range and an IGF or bandwidth extension range and an associated mapping between source and destination bands.

FIG. 3a illustrates a representation of a spectrum of amplitudes A(f) or squared amplitudes $A^2(f)$. In particular, an XOVER or IGF start frequency is illustrated.

Furthermore, a set of overlapping source bands are illustrated, where the source bands comprise the first spectral band 180, a further source band 302 and an even further source band 303. Additionally, destination bands above the IGF or XOVER frequency are the second spectral band 190, a further destination band 305, an even further destination band 307 and the third spectral band 202, for example.

Typically, mapping functions within the IGF or bandwidth extension framework define a mapping between the individual source bands 180, 302, 303 and the individual destination bands 305, 190, 307, 202. This mapping may be fixed as it is the case in 3GPP TS 26.445 or can be adaptively determined by a certain IGF encoder algorithm. In any case, FIG. 3a illustrates, in the lower table, the mapping between a destination band and the source band for the case of non-overlapping destination bands and overlapping source bands irrespective of whether this mapping is fixed or is adaptively determined and actually has been adaptively determined for a certain frame, the spectrum being illustrated in the upper portion of FIG. 3a.

Figure 4:
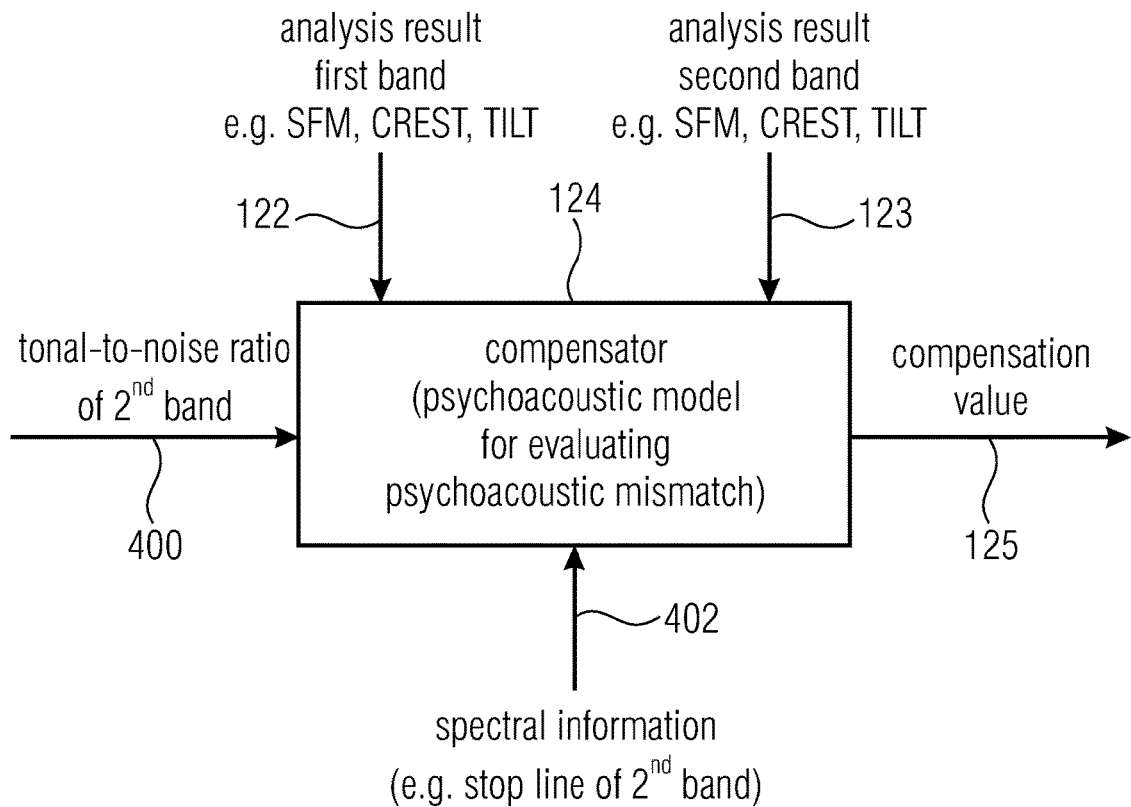
FIG. 4 illustrates a more detailed representation of the compensator.

FIG. 4 illustrates a more detailed implementation of the compensator 124. The compensator 124 receives, in this implementation, in addition to the first analysis result 122, which can be a spectral flatness measure, a crest factor, a spectral tilt value or any other kind of parametric data for the first spectral band, an analysis result 123 for the second spectral band. This analysis result may, once again, be a spectral flatness measure for the second spectral band, a crest factor for the second spectral band or a tilt value, i.e. a spectral tilt value limited to the second spectral band while the tilt value or spectral tilt value for the first spectral band is also limited for the first spectral band. Additionally, the compensator 124 receives a spectral information on the second spectral band such a stop line of the second spectral band. Thus, in the situation where the parametric calculator 126 of FIG. 2 is configured for parametrically coding third audio data in the third spectral band 202, the third spectral band comprises higher frequencies than the second spectral band. This is also illustrated in the example of FIG. 3a, where the third spectral band is at higher frequencies than the second spectral band, i.e. where band 202 has higher frequencies than band 190. In this situation, the compensator 124 is configured to use a weighting value in calculating the compensation value for the third spectral band, where this third weighting value is different for a weighting value used for calculating the compensation value for the second spectral band. Thus, in general, the compensator 124 influences the calculation of the compensation value 125 so that, for the same other input values, the compensation value is smaller for higher frequencies.

The weighting value can, for example, be an exponent applied in the calculation of the compensation value based on the first and the second analysis results such as the exponent a, as described later on, or can, for example, be a multiplicative value or even a value to be added or subtracted so that a different influence for higher frequencies is obtained compared to the influence when the parameter is to be calculated for lower frequencies.

Additionally, as illustrated in FIG. 4, the compensator receives a tonal-to-noise ratio for the second spectral band in order to calculate the compensation value dependent on the tonal-to-noise ratio of the second audio data in the second spectral band. Thus, a first compensation value is obtained for a first tonal-to-noise ratio or a second compensation value is obtained for a second tonal-to-noise ratio, where the first compensation value is greater than the second compensation value when the first tonal-to-noise ratio is greater than the second tonal-to-noise ratio.

As stated, the compensator 124 is configured to generally determine the compensation value by applying a psychoacoustic model, wherein the psychoacoustic model is configured to evaluate the psychoacoustic mismatch between the first audio data and the second audio data using the first analysis result and the second analysis result to obtain the compensation value. This psychoacoustic model evaluating the psychoacoustic mismatch can be implemented as a feedforward calculation as discussed later on in the context of the following SFM calculations or can, alternatively be a feedback calculation module applying a kind of an analysis by synthesis procedure. Furthermore, the psychoacoustic model may also be implemented as a neural network or a similar structure that is automatically drained by certain training data to decide in which case a compensation may be used and in which case not.

Subsequently, the functionality of the compensation detector 210 illustrated in FIG. 2 or, generally, a detector included in the parameter calculator 120 is illustrated.

Figure 6:
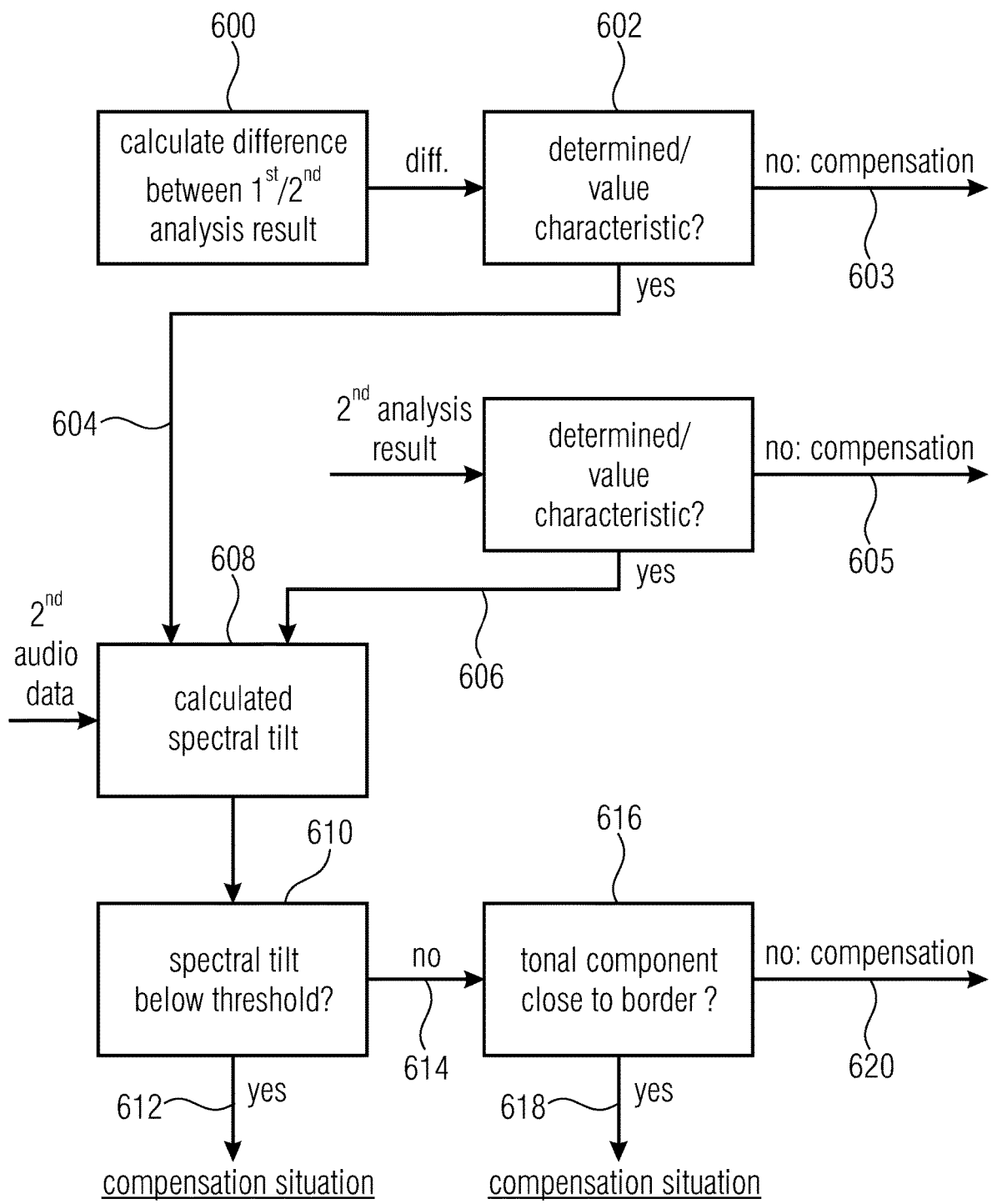
FIG. 6 illustrates a flowchart for illustrating the compensation detector functionality in an embodiment.

The compensation detector functionality is configured to detect a compensation situation when a difference between the first analysis result and the second analysis result has a predetermined characteristic as illustrated, for example, at 600 and 602 in FIG. 6. Block 600 is configured to calculate a difference between the first and the second analysis result and block 602 then determines whether the difference has a predetermined characteristic or a predetermined value. If it is determined that the predetermined characteristic is not there, then it is determined by block 602 that no compensation is to be performed as illustrated at 603. If, however, it is determined that the predetermined characteristic exists, then control proceeds via line 604. Furthermore, the detector is configured to alternatively or additionally determine whether the second analysis result has a certain predetermined value or a certain predetermined characteristic. If it is determined that the characteristic does not exist, then line 605 signals that no compensation is to be performed. If, however, it is determined that the predetermined value is there, control proceeds via line 606. In embodiments, lines 604 and 606 may be sufficient to determine whether there is a compensation or not. However, in the embodiment illustrated in FIG. 6, further determinations based on the spectral tilt of the second audio data for the second spectral band 190 of FIG. 1 are performed as described later on.

In an embodiment, the analyzer is configured to calculate a spectral flatness measure, a crest factor or a quotient of the spectral flatness measure and the crest factor for the first spectral band as the first analysis result and to calculate a spectral flatness measure or a crest factor or a quotient of the spectral flatness measure and the crest factor of the second audio data as the second analysis result.

In such an embodiment, the parameter calculator 126 is additionally configured to calculate, from the second audio data, a spectral envelope information or a gain factor.

Furthermore, in such an embodiment, the compensator 124 is configured to calculate the compensation value 125 so that, for a first difference between the first analysis result and the second analysis result, a first compensation value is obtained, and for a difference between the first analysis result and the second analysis result, a second compensation value is calculated, where the first difference is greater than the second difference, when the first compensation value is greater than the second compensation value.

In the following, the description of FIG. 6 will be continued by illustrating the optional additional determination whether a compensation situation is to be detected or not.

In block 608, a spectral tilt is calculated from the second audio data. When it is determined that this spectral tilt is below a threshold as illustrated in 610, then a compensation situation is positively affirmed as illustrated at 612. When, however, it is determined that the spectral tilt is not below the predetermined threshold, but above the threshold, then this situation is signaled by line 614. In block 616, it is determined whether a tonal component is close to a border of the second spectral band 190. When it is determined that there is a tonal component close to the border as illustrated by item 618, then a compensation situation is once again positively affirmed. When, however, it is determined that no tonal component exists close to a border, then any compensation is canceled, i.e., switched off as illustrated by line 620. The determination in block 616, i.e., the determination whether a tonal component is close to a border or not is made by performing, in any embodiment, a shifted SFM calculation. When there is a strong decline in the slope as determined by block 608, then the frequency region, for which the SFM is calculated, will be shifted down by half the width of the corresponding scale factor band (SFB) or the second spectral band. For a strong incline, the frequency region, for which the SFM is calculated is shifted up by half the width of the second spectral band. In this way, tonal components that are supposed to be damped can still be correctly detected due to a low SFM while for higher SFM values, damping will not be applied.

Figure 5:
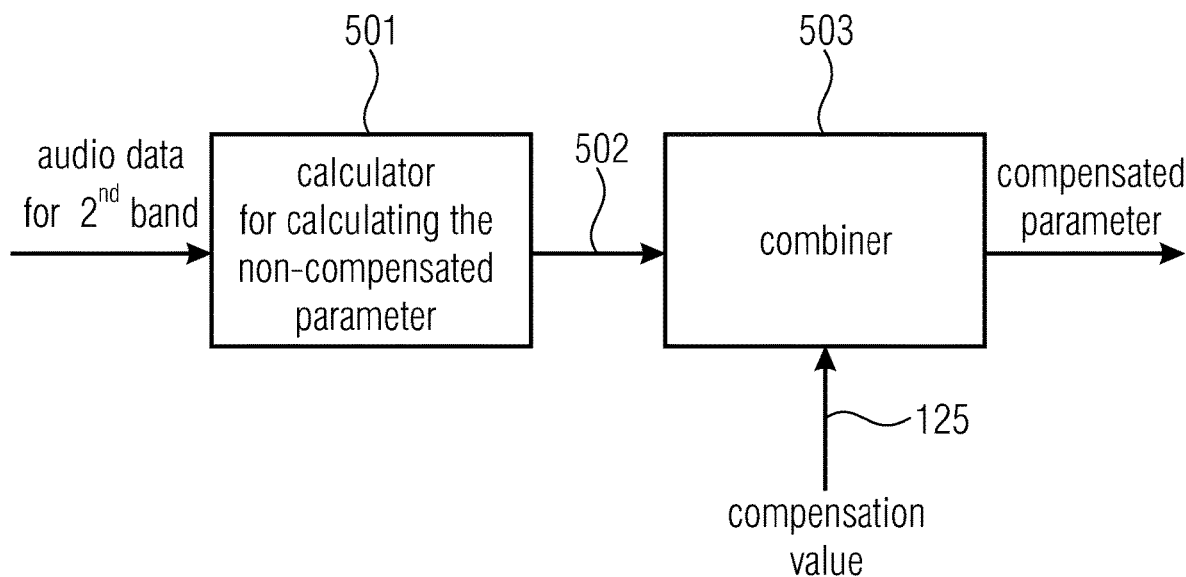
FIG. 5 illustrates a more detailed representation of the parameter calculator.

Subsequently, FIG. 5 is discussed in more detail. Particularly, the parameter calculator 126 may comprise the calculator 501 for calculating the non-compensated parameter from the audio data for the second spectral band, i.e., the destination band, and the parameter calculator 126 additionally comprises a combiner 503 for combining the non-compensated parameter 502 and the compensation value 125. This combination may, for example, be a multiplication, when the non-compensated parameter 502 is a gain value and the compensation value 105 is a quantitative compensation value. However, the combination performed by the combiner 503 can, alternatively, also be a weighting operation using the compensation value as an exponent or an additive modification where the compensation value is used as an additive or subtractive value.

Furthermore, it is to be noted that the embodiment illustrated in FIG. 5, where the non-compensated parameter is calculated and, then, a subsequent combination with the combination value is performed, is only an embodiment. In alternative embodiments, the compensation value can already be introduced into the calculation for the compensated parameter so that any intermediate result with an explicit non-compensated parameter does not occur. Instead, only a single operation is performed where, as a result of this "single operation", the compensated parameter is calculated using the compensation value and using a calculation algorithm which would result in the non-compensated parameter, when the compensation value 125 would not be introduced into such a calculation.

Figure 7:
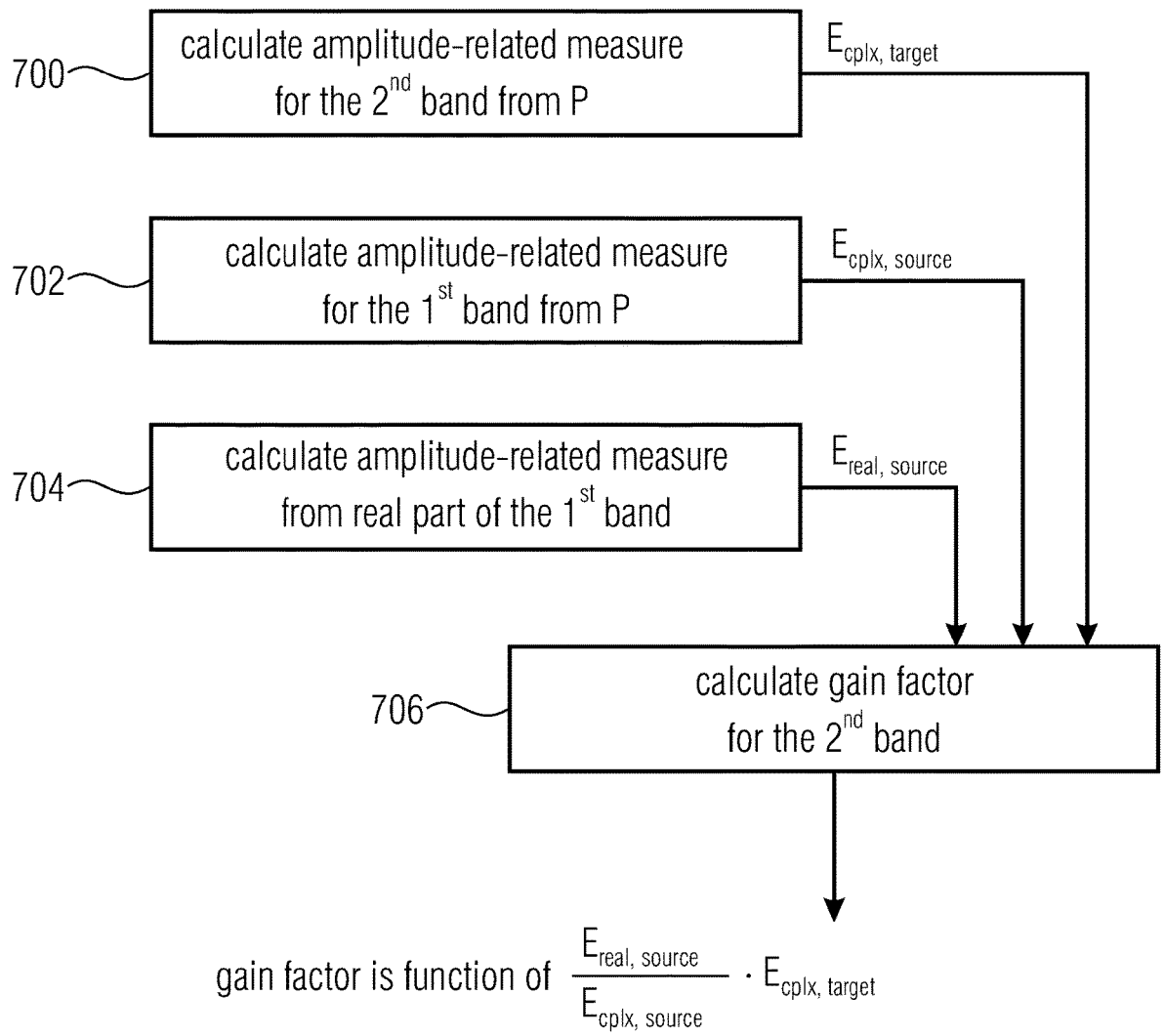
FIG. 7 illustrates a functionality of the parameter calculator for calculating a non-compensated gain factor.
Figure 7:
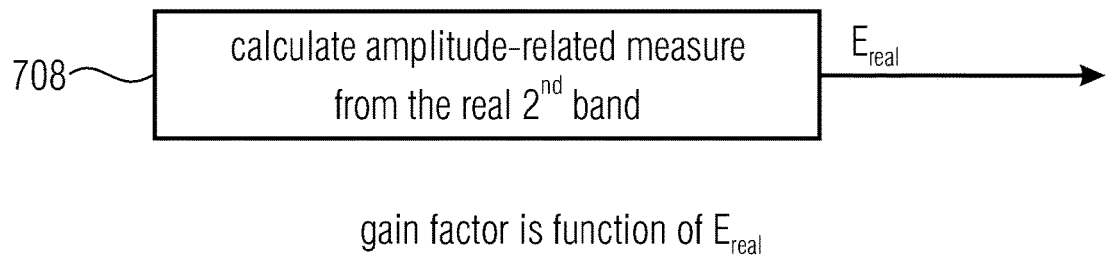

FIG. 7 illustrates a procedure to be applied by the calculator 501 for calculating the non-compensated parameter. The representation in FIG. 7 "IGF scale factor calculation" roughly corresponds to section 5.3.3.2.11.4 of 3gpp TS 26.445 V13.3.3 (2015/12). When, a "complex" TCX power spectrum P (a spectrum, where the real parts and the imaginary parts of spectral lines are evaluated) is available, then the calculator 501 for calculating the non-compensated parameter of FIG. 5 performs a calculation of an amplitude-related measure for the second spectral band from the power spectrum P as illustrated at 700. Furthermore, the calculator 501 performs a calculation of an amplitude-related measure for the first spectral band from the complex spectrum P as illustrated at 702. Additionally, the calculator 501 performs a calculation of an amplitude-related measure from the real part of the first spectral band, i.e., the source band as illustrated at 704, so that three amplitude-related measures $E_{cplx,\ target}$, $E_{cplx,\ source}$, $E_{real,\ source}$ are obtained and input into a further gain factor calculation functionality 706 to finally obtain a gain factor being a function of the quotient between $E_{real,\ source}$ and $E_{cplx,\ source}$ multiplied by $E_{cplx,\ target}$.

When, alternatively, the complex TCX power spectrum is not available, then the amplitude-related measure is only calculated from the real second spectral band as illustrated at the bottom of FIG. 7.

Furthermore, it is to be noted that the TCX power spectrum P is calculated, for example, as illustrated in subclause 5.3.3.2.11.1.2 based on the following equation:

$$P(sb)=R^2(sb)+I^2(sb), sb=0,1,2,\ldots,n-1.$$

Here, n is the actual TCX window length, R is the vector containing the real valued part (cos-transformed) of the current TCX spectrum, and I is the vector containing the imaginary (sin-transformed) part of the current TCX spectrum. Particularly, the term "TCX" is related to the 3gpp terminology, but generally mentions the spectral values in the first spectral band or the second spectral band as provided by the spectral analyzer 130 to the core encoder 110 or the parametric coder 120 of FIG. 1.

Figure 8A:
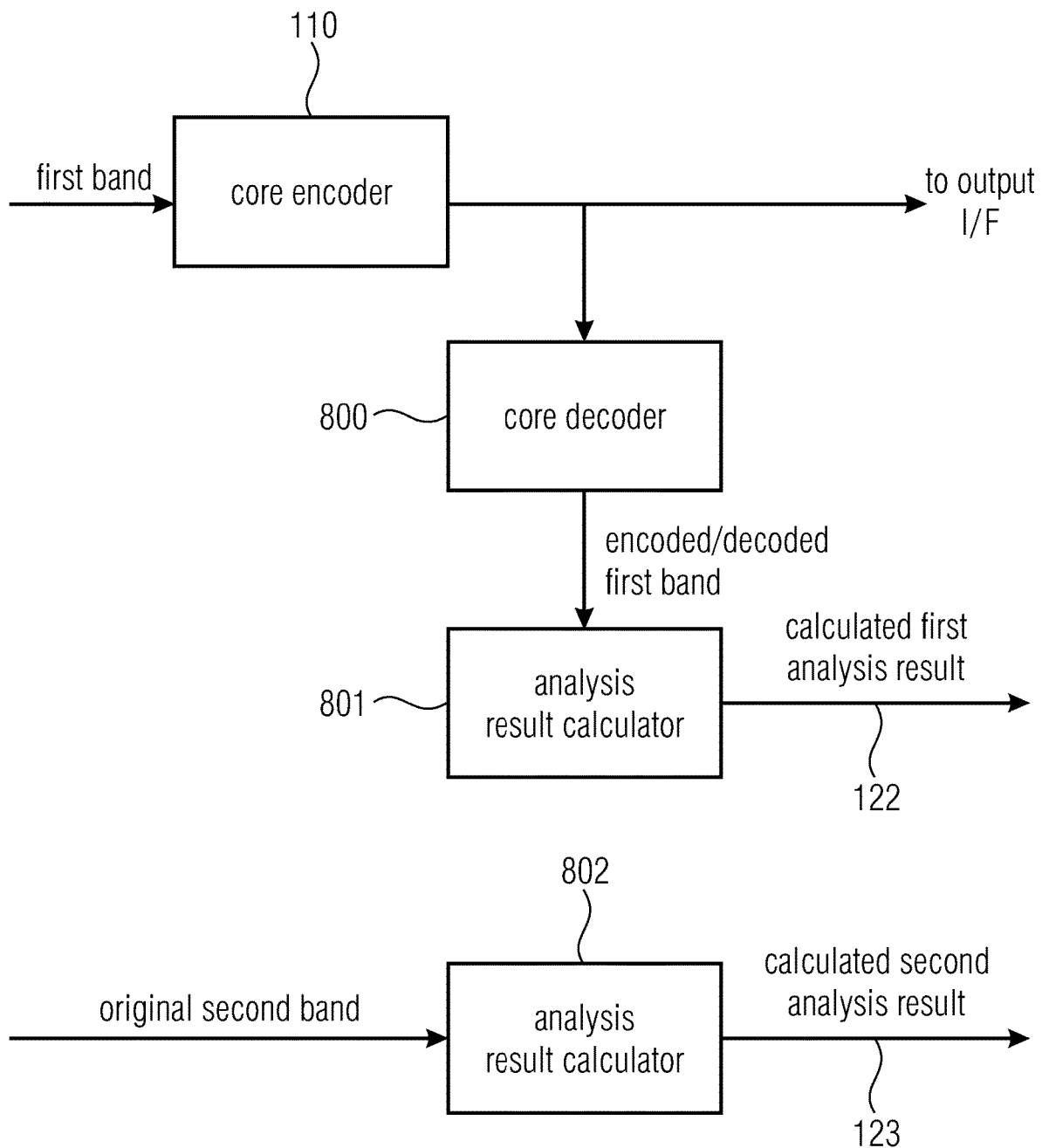
FIG. 8*a* illustrates an encoder implementation having a core decoder for calculating the first analysis result from an encoded and decoded first spectral band.

FIG. 8a illustrates an embodiment, where the signal analyzer 121 further comprises a core decoder 800 for calculating an encoded and again decoded first spectral band and for calculating, naturally, the audio data in the encoded/decoded first spectral band.

Then, the core decoder 800 feeds the encoded/decoded first spectral band into an analysis result calculator 801 included in the signal analyzer 821 to calculate the first analysis result 122. Furthermore, the signal analyzer comprises a second analysis result calculator 802 included in the signal analyzer 121 of FIG. 1 for calculating the calculated second analysis result 123. Thus, the signal analyzer 121 is configured in such a way that the actual first analysis result 122 is calculated using the encoded and again decoded first spectral band while the second analysis result is calculated from the original second spectral band. Thus, the situation on the decoder-side is better simulated on the encoder-side, since the input into the analysis result calculator 801 already has all the quantization errors included in the decoded first audio data for the first spectral band available at the decoder.

Figure 8B:
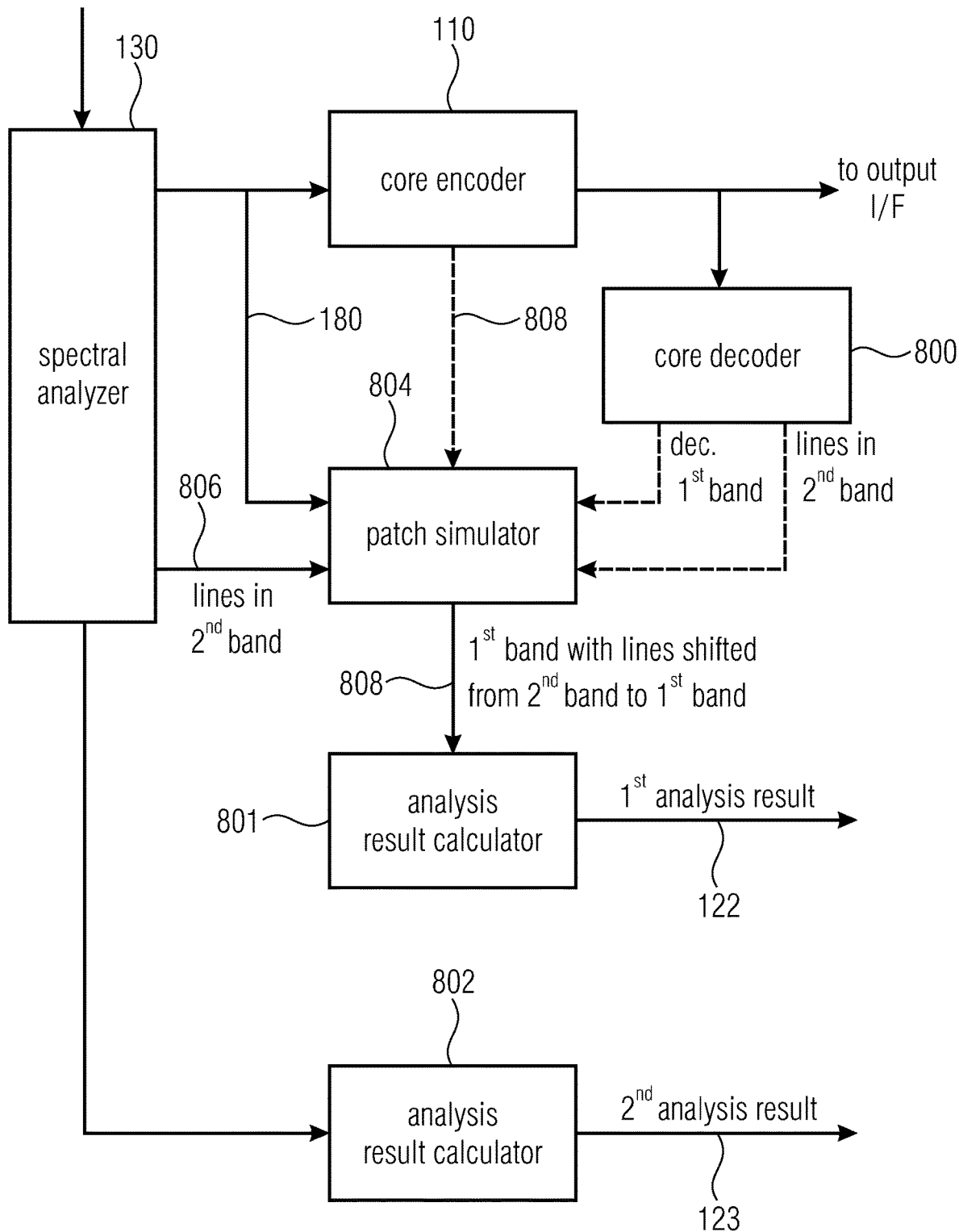
FIG. 8*b* illustrates a block diagram of an encoder in an embodiment, in which a patch simulator is applied for generating a first spectral bandwidth line shifted from the second spectral band to obtain the first analysis result.

FIG. 8b illustrates a further implementation of the signal analyzer that has, either alternatively to the FIG. 8a procedure, or additionally to the FIG. 8a procedure a patch simulator 804. The patch simulator 804 specifically acknowledges the functionality of the IGF encoder, i.e., that there can be lines or at least one line within the second destination band which is actually encoded by the core encoder.

Figure 3B:
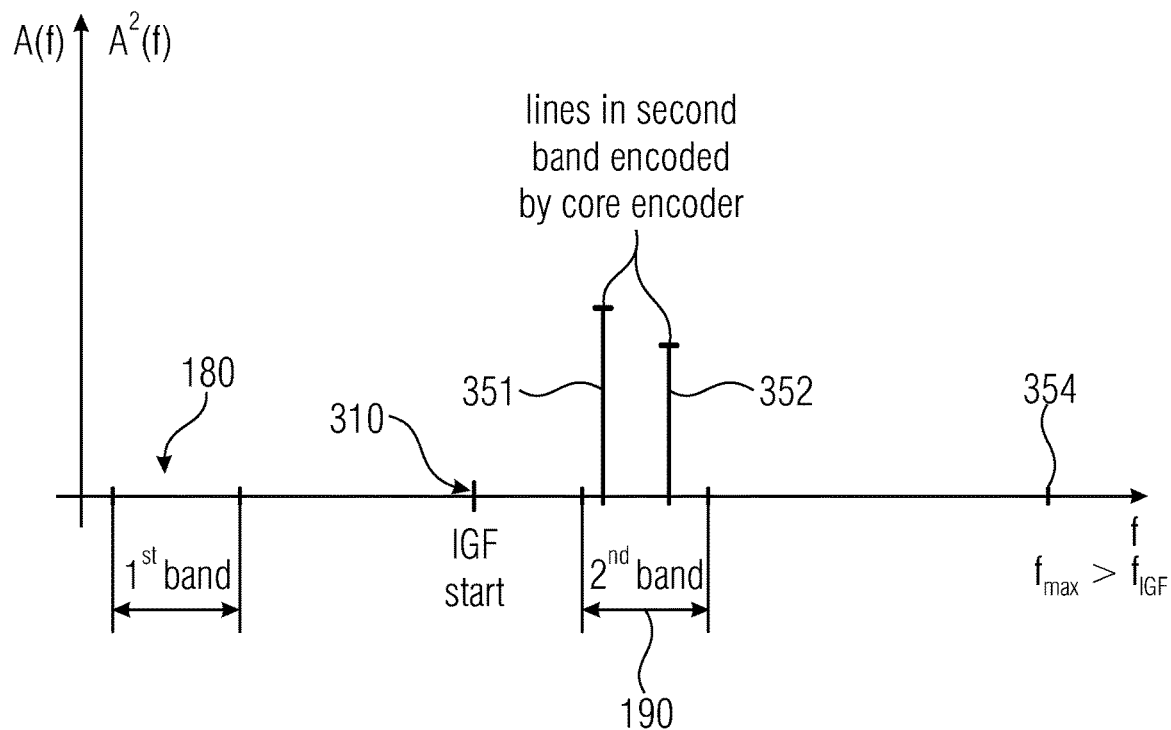
FIG. 3*b* illustrates a spectrum of an audio signal where the core encoder applies IGF technology and where there are surviving lines in the second spectral band.

Particularly, this situation is illustrated in FIG. 3b.

FIG. 3b illustrates, similar to FIG. 3a, upper portion, the first spectral band 180 and the second spectral band 190. However, in addition to what has been discussed in FIG. 3a, the second spectral band comprises specific lines 351, 352 included within the second spectral band that have been determined by the spectral analyzer 130 as lines that are additionally encoded by the core encoder 110 in addition to the first spectral band 180.

This specific coding of certain lines above the IGF start frequency 310 reflects the situation that the core encoder 110 is a full band encoder having a Nyquist frequency up to $f_{max}$ 354 being higher than the IGF start frequency. This is in contrast to SBR technology-related implementations there the crossover frequency is also the maximum frequency and, therefore, the Nyquist frequency of the core encoder 110.

The test simulator 804 receives either the first spectral band 180 or the decoded first spectral band from the core decoder 800 and, additionally, information from the spectral analyzer 130 or the core encoder 110 that there are actually lines in the second spectral band that are included in the core encoder output signal. This is signaled by the spectral analyzer 130, via a line 806 or is signaled by the core encoder via a line 808. The patch simulator 804 now simulates the first audio data for the first spectral band by using the straightforward first audio data for the four spectral bands and by inserting the lines 351, 352 from the second spectral band into the first spectral band by shifting these lines to the first spectral band. Thus, lines 351' and 352' represent spectral lines obtained by shifting the lines 351, 352 of FIG. 3b from the second spectral band into the first spectral band. Advantageously, the spectral lines 351, 352 are generated in such a way for the first spectral band that the location of these lines within the band borders are identical in both bands, i.e., the difference frequency between a line and the band border is identical to the second spectral band 190 and the first spectral band 180.

Figure 3C:
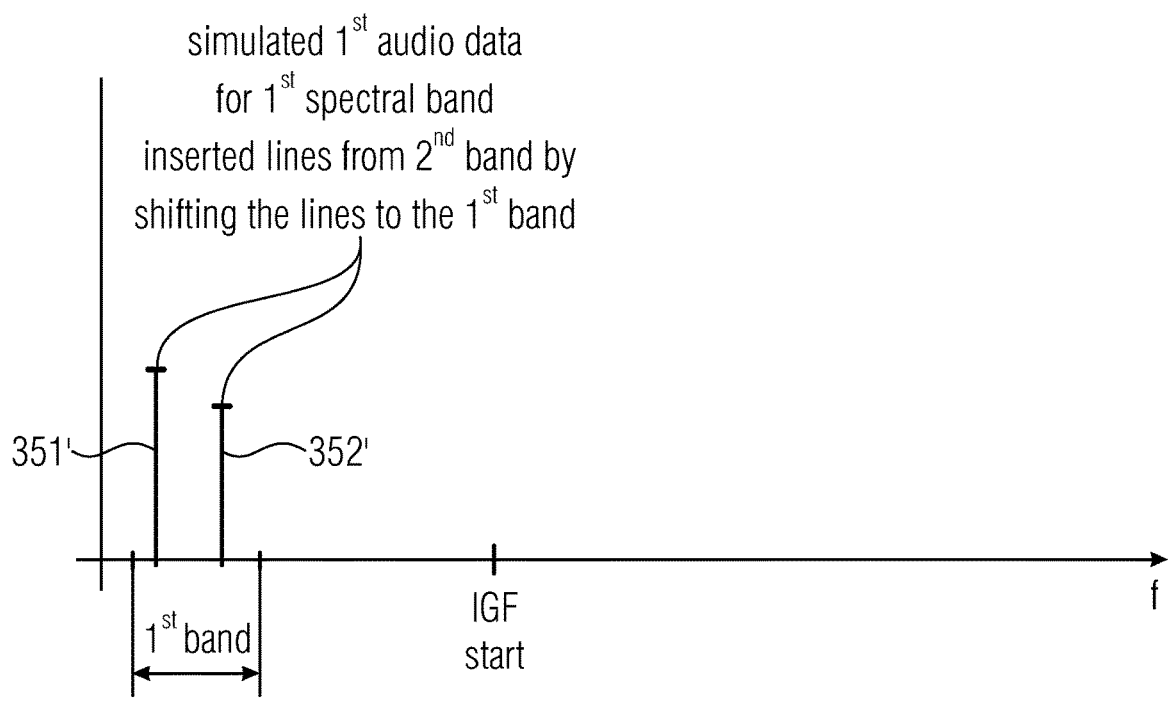
FIG. 3*c* illustrates a representation of a simulated first audio data in the first spectral band to be used for the calculation of the first analysis result.

Thus, the patch simulator outputs a simulated data 808 illustrated in FIG. 3c having a straightforward first spectral band data and, additionally, having the lines shifted from the second spectral band to the first spectral band. Now, the analysis result calculator 801 calculates the first analysis result 102 using the specific data 808 while the analysis result calculator 802 calculates the second analysis result 123 from the original second audio data in the second spectral band, i.e., the original audio data including the lines 351, 352 illustrated in FIG. 3b.

This procedure with the patch simulator 804 has the advantage that it is not necessary to put certain conditions on the additional lines 351, 352, such as high tonality or anything else. Instead, it is totally up to the spectral analyzer 130 or the core encoder 110 to decide whether certain lines in the second spectral band are to be encoded by the core encoder. The result of this operation, however, is automatically accounted for by using these lines as an additional input for the calculation of the first analysis result 122 as illustrated in FIG. 8b.

Subsequently, the effect of a tonality mismatch within an intelligent gap filling framework is illustrated.

Figure 9:
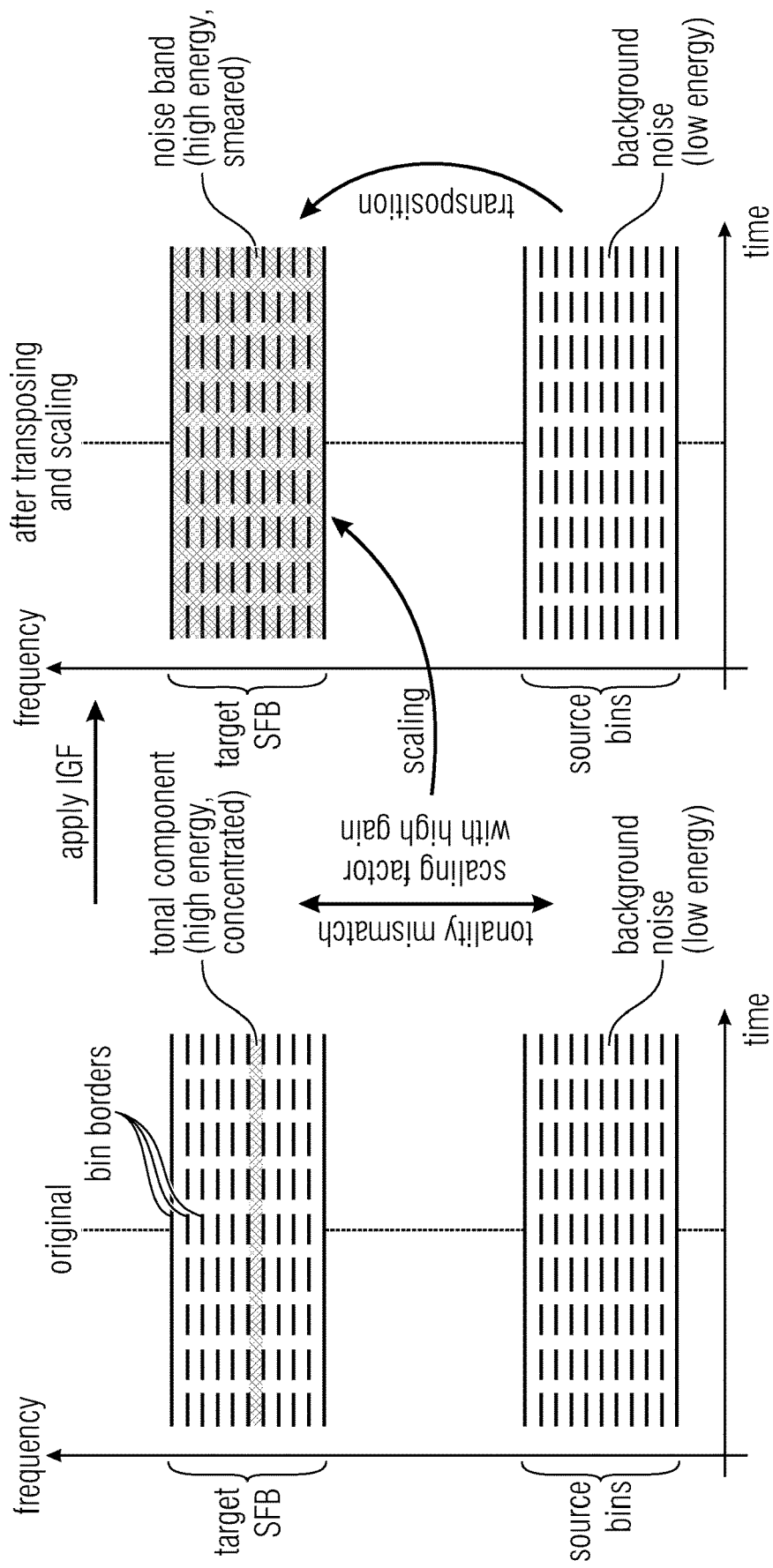
FIG. 9 illustrates an effect of a tonality mismatch in an intelligent gap filling implementation.

In order to detect noise band artifacts the difference in tonality between the source and target scale factor bands (SFBs) has to be determined. For tonality calculation the spectral flatness measure (SFM) can be used. If a tonality mismatch—where the source band is much noisier than the target band—is found, a certain amount of damping should be applied. This situation is depicted in FIG. 9 without the inventive processing applied.

It is also sensible to apply some smoothing to damping factors in order to avoid an abrupt on-/off behavior of the tool. A detailed description of the steps to apply damping in the right places is given in the following. (Note that damping will only be applied if both the TCX power spectrum P is available and the frame is non-transient (flag is Transient inactive).)

Tonality Mismatch Detection: Parameters

In a first step, those SFBs, where a tonality mismatch might cause noise band artefacts, have to be identified. In order to do so the tonality in each SFB of the IGF range and the corresponding bands that are used for copy-up has to be determined. One suitable measure for calculating tonality is the spectral flatness measure (SFM) which is based on a division of the geometric mean of a spectrum by its arithmetic mean and ranges between 0 and 1. Values close to 0 indicate strong tonality while a value approaching 1 is a sign of a very noisy spectrum. The formula is given as $$sfm(P, b, e) = 2^{(\frac{1}{2}+p)}\left(\frac{1}{e-b}\left(1 + \sum_{sb=b}^{e-1} P(sb)\right)\right)^{-1}$$

where P is the TCX power spectrum, b the start line and e the stop line of the current SFB while p is defined as $$p = \frac{1}{e-b}\sum_{sb=b}^{e-1} \lfloor \max(0, \log_2(P(sb))) \rfloor$$

Additionally to the SFM, the crest factor is calculated which also gives an indication of how the energy is distributed inside a spectrum by dividing the maximum energy by the mean energy of all the frequency bins in the spectrum. Dividing the SFM by the crest factor results in a tonality measure of an SFB for the current frame. The crest factor is calculated by $$crest\,(P, b, e) = \max\left(1, E_{max}\left(\frac{1}{e-b}\sum_{sb=b}^{e-1} \lfloor \max(0, \log_2(P(sb))) \rfloor^2\right)^{-\frac{1}{2}}\right)$$

where P is the TCX power spectrum, b the start line and e the stop line of the current SFB while $E_{max}$ is defined as $$E_{max} = \left\lfloor \max_{sb \in [b,e[ \subset N}(0, \log_2(P(sb))) \right\rfloor$$

It is, however, sensible to also use results from previous frames to achieve a smooth tonality estimation. Thus, the tonality estimation is done with the following formula:

$$SFM = \min\left(2.7, \frac{sfm}{crest} + \frac{sfm_{prev}}{crest_{prev}} + 0.5 * SFM_{prev}\right),$$

where sfm denotes the result of the actual spectral flatness calculation, while the variable SFM includes the division by the crest factor as well as smoothing.

Now the difference in tonality between source and destination is calculated:

$$SFM_{diff} = SFM_{src} - SFM_{dest}$$

For positive values of this difference the condition that something that is noisier than the target spectrum is used for copy-up is fulfilled. Such an SFB becomes a likely candidate for damping.

However, a low SFM value does not necessarily indicate strong tonality but can also be due to a sudden decline or incline of the energy in an SFB. This particularly applies to items where there is band-limitation somewhere in the middle of an SFB. This can lead to unwanted damping creating the impression of a slightly low-pass filtered signal.

In order to avoid damping in such cases, possibly affected SFBs are determined by calculating the spectral tilt of the energy in all bands with positive $SFM_{diff}$, where a strong tilt in one direction might indicate a sudden drop that causes a low SFM value. The spectral tilt is calculated as a linear regression through all spectral bins in the SFB, with the slope of the regression line given by the following formula:

$$slope = \left(\sum_i x_i P_i - \frac{1}{e-b}\sum_i x_i \sum_i P_i\right)\left(\sum_i x_i^2 - \frac{1}{e-b}\left(\sum_i x_i\right)^2\right)^{-1},$$

$$i = b, \ldots, e-1$$

with x as the bin number, P the TCX power spectrum, b the start line and e the stop line of the current SFB.

However, a tonal component close to a border of an SFB might also cause a steep tilt, but should still be subjected to damping. To separate these two cases, another shifted SFM calculation should be performed for bands with steep tilt.

The threshold for the slope value is defined as $$thresh_{tilt} = \frac{60}{e-b}$$

with division by the SFB width as normalization.

If there is a strong decline slope<$-thresh_{tilt}$, the frequency region for which SFM is calculated will be shifted down by half the width of the SFB; for a strong incline slope>$thresh_{tilt}$ it is shifted up. In this way, tonal components that are supposed to be damped can still be correctly detected due to low SFM while for higher SFM values damping will not be applied. The threshold here is defined as the value 0.04, where damping is only applied if the shifted SFM falls below the threshold.

Perceptual Annoyance Model

Damping should not be applied for any positive $SFM_{diff}$, but only makes sense if the target SFB is indeed very tonal. If in a specific SFB the original signal is superimposed by a noisy background signal, then the perceptual difference to an even noisier band will be small and the dullness due to loss of energy by damping may outweigh the benefits.

To ensure application within reasonable bounds damping should only be used if the target SFB is indeed very tonal. So only whenever both $$SFM_{diff} > 0$$

and $$SFM_{dest} < 0.1$$

hold, damping should be applied.

Another matter that should be considered is the background of tonal components in the IGF spectrum. The perceptual degradation caused by noise-band artefacts is likely to be most apparent whenever there is little to no noise-like background surrounding the original tonal component. In this case, when comparing the original with the IGF-created HF spectrum, an introduced noise band will be perceived as something entirely new and thus stick out very prominently. If, on the other hand, there already is a considerable amount of background noise existent, then the additional noise blends in with the background resulting in a less jarring perceptual difference. Thus, the amount of applied damping should also depend on the tonal-to-noise ratio in the affected SFB.

For the calculation of this tonal-to-noise ratio the squared TCX power spectral values P of all bins i in an SFB are summed up and divided by the width of the SFB (given by start line b and stop line e) to get the average energy of the band. This average is subsequently used to normalize all the energies in the band.

$$P_{norm,k} = \sqrt{P_k}\left(\frac{1}{e-b} * \sum_{sb=b}^{e-1}\sqrt{P_{sb}}\right)^{-1}, k=b, \ldots, e-1$$

All bins with a normalized energy $P_{norm,k}$ below 1 are then summed up and counted as the noise part $P_{noise}$ while everything above a threshold of 1+adap with $$adap = \frac{e-b}{40}$$

is counted as the tonal part $P_{tonal}$. This threshold is dependent on the width of the SFB so that smaller bands get a lower threshold to account for the higher average due to the bigger influence of the high-energy bins of the tonal component. From the tonal and the noise part finally a log-ratio is computed.

$$tonalToNoise = 20 * \log_{10}\left(\frac{P_{tonal}}{P_{noise}}\right)$$

Damping depends on both the difference in SFM between source and destination and the SFM of the target SFB where higher differences and a smaller target SFM should both lead to stronger damping. It is reasonable that for a bigger difference in tonality a stronger damping should be applied. Furthermore, the amount of damping should also increase more quickly if the target SFM is lower, i.e. the target SFB more tonal. This means that for extremely tonal SFBs a stronger damping will be applied than for SFBs where the SFM falls just within the damping range.

Additionally, damping should also be applied more sparingly for higher frequencies as taking away the energy in the highest bands might easily lead to the perceptual impression of band-limitation while the fine structure of the SFBs becomes less important due to decreasing sensitivity of the human auditory system towards higher frequencies.

Tonality Mismatch Compensation: Calculation of Damping Factor

To incorporate all these considerations into a single damping formula the ratio between the target and the source SFM is taken as the basis of the formula. In this way both a bigger absolute difference in SFM and a smaller target SFM value will lead to stronger damping which makes it more suitable than simply taking the difference. To also add dependencies on frequency and tonal-to-noise ratio adjustment parameters are applied to this ratio. Thus, the damping formula can be written as $$d_{curr} = \left(\frac{SFM_{dest}}{SFM_{src}}\right)^\alpha + \beta,$$

where d is the damping factor that will be multiplied with the scaling factor and $\alpha$ and $\beta$ the damping adjustment parameters that are calculated as $$\alpha = \min\left(\frac{320}{e-1}, 1.25\right)$$

where e is the stop line of the current SFB and $$\beta = \begin{cases} 0.1 * ((10 + adap) - tonalToNoise), & \text{if } ((10 + adap) - tonalToNoise) > 0 \\ 0, & \text{else} \end{cases}$$

where adap is dependent on the SFB width calculated by $$adap = \frac{width}{40}$$

The parameter a decreases with frequency in order to apply less damping for higher frequencies while $\beta$ is used to further reduce the strength of the damping if the tonal-to-noise ratio of the SFB that is to be damped falls below a threshold. The more significantly it falls below this threshold, the more the damping is reduced.

As damping is only activated within certain constraints, smoothing may be applied in order to prevent abrupt on/off transitions. To realize this, several smoothing mechanisms are active.

Directly after a transient, a core switch to TCX or an undamped previous frame damping is only gradually applied with full force to avoid extreme energy drops after high-energy transients. Furthermore, a forgetting factor in the form of an IIR filter is utilized to also take the results of previous frames into account.

All smoothing techniques are comprised in the following formula:

$$d = \min\left(\frac{d_{curr} + d_{prev}}{2} + 0.1 * \text{smooth}, 1\right),$$

where $d_{prev}$ is the damping factor of the previous frame. If damping was not active in the previous frame $d_{prev}$ is overwritten with $d_{curr}$ but limited to a minimum of 0.1. The variable smooth is an additional smoothing factor that will be set to 2 during transient frames (flag isTransient active) or after core switches (flag isCelpToTCX active), to 1 if in the previous frame damping was inactive. In each frame with damping the variable will be decreased by 1, but may not fall below 0.

In the final step, the damping factor d is multiplied with the scaling gain g:

$$g_{damped} = g*d$$

Figure 10:
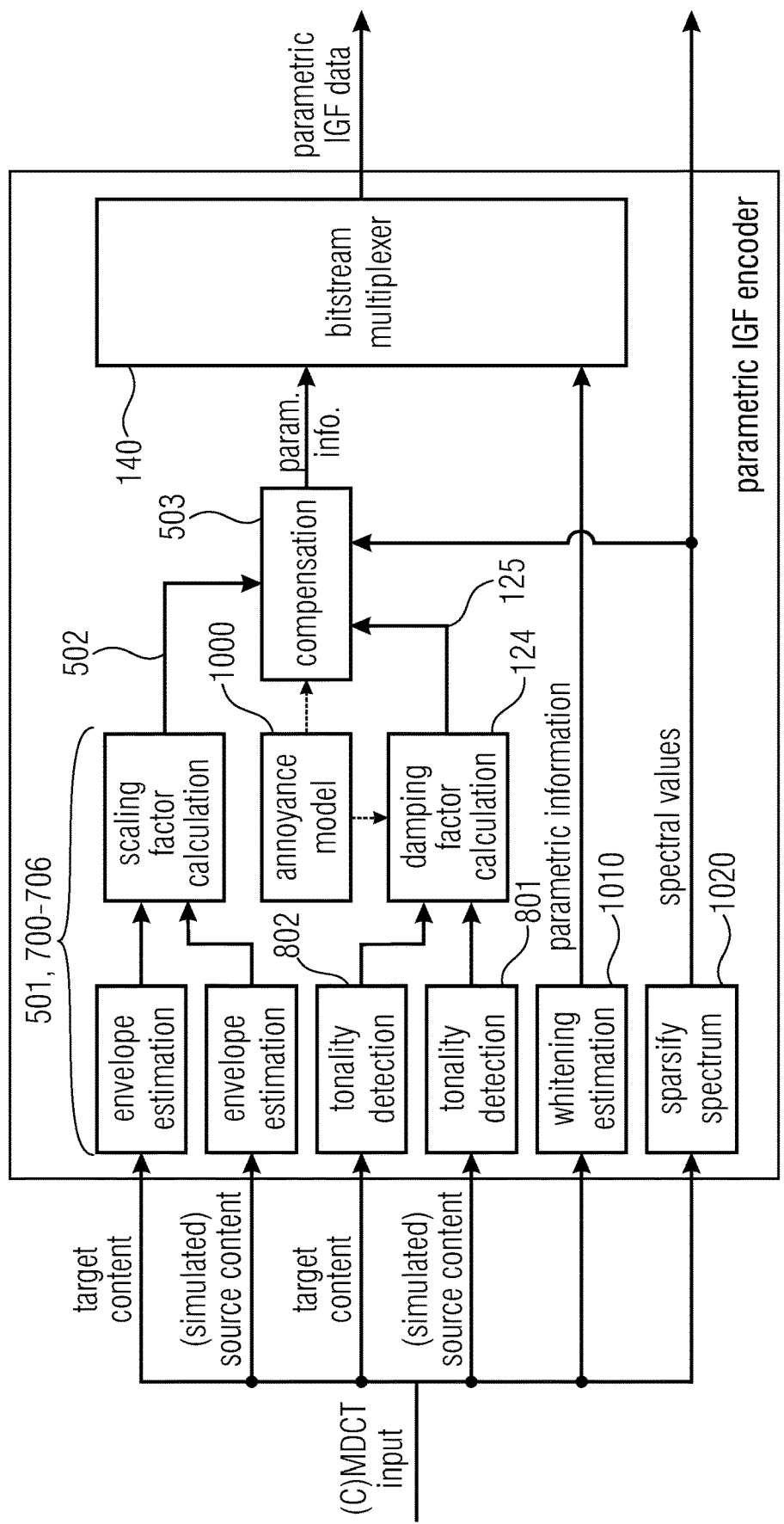
FIG. 10 illustrates, in an embodiment, the implementation of the parametric encoder.

FIG. 10 illustrates an implementation of the present invention.

The audio signal as, for example, output by the spectral analyzer 130 is available as an MDCT spectrum or even a complex spectrum as indicated by (c) to the left of FIG. 10.

The signal analyzer 121 is implemented by the tonality detectors 801 and 802 in FIG. 10 for detecting the tonality of the target content by block 802 and for detecting the tonality of the (simulated) source content at item 801.

Then, the damping factor calculation 124 is performed to obtain the compensation value and, then, the compensator 503 operates using the data obtained from item 501, 700-706. Item 501 and item 700-706 reflect the envelope estimation from the target content and the envelope estimation from the simulated source content and the subsequent scaling factor calculation as, for example, illustrated in FIG. 7 at item 700-706.

Thus, the non-compensated scaling vector is input into block 503 as value 502 in analogy to what has been discussed in the context of FIG. 5. Furthermore, a noise model 1000 is illustrated in FIG. 10 as a separate building block, although same can also be directly included within the damping factor calculator 124 as has been discussed in the context of FIG. 4.

Furthermore, the parametric IGF encoder in FIG. 10 additionally comprising a whitening estimator is configured for calculating whitening levels as discussed, for example, in item 5.3.3.2.11.6.4 "Coding of IGF whitening levels". Particularly, IGF whitening levels are calculated and transmitted using one or two bits per tile. This data is introduced into the bitstream multiplexer 140 as well in order to finally obtain the complete IGF parametric data.

Furthermore, block "sparsify spectrum" that may correspond to block 130 with respect to the determination of spectral lines to be encoded by the core encoder 110 is additionally provided and is illustrated as a separate block 1020 in FIG. 10. This information may be used by the compensator 503 in order to reflect the specific IGF situation.

Furthermore, the term "simulated" to the left of block 801 and the "envelope estimation" block in FIG. 10 refers to the situation illustrated in FIG. 8a, where the "simulated source content" is the coded and again decoded audio data in the first spectral band.

Alternatively, the "simulated" source content is the data obtained by the patch simulator 804 from the original first audio data in the first spectral band as indicated by line 180 or is the decoded first spectral band as obtained by the core decoder 800 enriched with the lines shifted from the second spectral band to the first spectral band.

Subsequently, a further embodiment of the invention constituting an amended version of a 3gpp TS 26.445 codec is illustrated. Newly added text specifying the inventive processing is provided in the following. Herein, explicit reference is made to certain subclauses already contained in the 3gpp TS 26.445 specification.

5.3.3.2.11.1.9 The Spectral Tilt Function SLOPE

Let $P \in P^n$ be the TCX power spectrum as calculated according to subclause 5.3.3.2.11.1.2 and b the start line and e the stop line of the spectral tilt measurement range.

The SLOPE function, applied with IGF, is defined with:

$$\text{SLOPE}: P^n \times N \times N \to P,$$

$$\text{SLOPE}: (P, b, e) = \left(\sum_{sb=b}^{e-1} x(sb)P(sb) - \frac{1}{e-b}\sum_{sb=b}^{e-1} x(sb)\sum_{sb=b}^{e-1} P(sb)\right)$$

$$\left(\sum_{sb=b}^{e-1} x(sb)^2 - \frac{1}{e-b}\left(\sum_{sb=b}^{e-1} x(sb)\right)^2\right)^{-1},$$

where n is the actual TCX window length and x the bin number.

5.3.3.2.11.1.10. The Tonal-to-Noise Ratio Function TNR

Let $P \in P^n$ be the TCX power spectrum as calculated according to subclause 5.3.3.2.11.1.2 and b the start line and e the stop line of the tonal-to-noise ratio measurement range.

The TNR function, applied with IGF, is defined with:

$$TNR: P^n \times N \times N \to P,$$

$$TNR(P, b, e) =$$

$$20 * \log_{10}\left(\sum_{\substack{sb=b \\ P_{norm}(sb) > 1 + adap}}^{e-1} P_{norm}(sb) \left(\sum_{\substack{sb=b \\ P_{norm}(sb) < 1}}^{e-1} P_{norm}(sb)\right)^{-1}\right),$$

where n is the actual TCX window length, $P_{norm}(sb)$ is defined with $$P_{norm}(sb) = \sqrt{P(sb)}\left(\frac{1}{e-b}\sum_{i=b}^{e-1} \sqrt{P_i}\right)^{-1}$$

and adap is defined with $$adap = \frac{e-b}{40}.$$

Damping:

For the IGF damping factor calculation 6 static arrays (prevTargetFIR, prevSrcFIR, prevTargetIIR and prevSrcIIR for the SFM calculation in target and source range as well as prevDamp and dampSmooth), all of size n8 are needed to hold filter-states over frames. Additionally a static flag was Transient is needed to save the information of the input flag is Transient from the previous frame.

Resetting Filter States

The vectors prevTargetFIR, prevSrcFIR, prevTargetIIR, prevSrcIIR, and prevDamp and dampSmooth are all static arrays of size n8 in the IGF module and are initialized as follows:

$$\text{for } k = 0, 1, \ldots, nB - 1 \begin{cases} prevTargetFIR(k) := 0 \\ preSrcFIR(k) := 0 \\ prevTargetIIR(k) := 0 \\ prevSrcFIR(k) := 0 \\ prevDamp(k) := -1 \\ dampSmooth(k) := 2 \end{cases}$$

This initialization shall be done
With codec start up
With any bitrate switch
With any codec type switch
With transition from CELP to TCX, e.g. isCelpToTCX=true
If the current frame has transient properties, e.g. isTransient=true
If the TCX power spectrum P is not available Calculation of Damping Factor If the TCX power spectrum P is available and is Transient is false, calculate $$tmpTarget(k) := \frac{SFM(P, t(k), t(k+1))}{CREST(P, t(k), t(k+1))}, k = 0, 1, \ldots, nB - 1 \text{ and}$$

$$tmpSrc(k) := \frac{SFM(P, m(t(k)), m(t(k+1)))}{CREST(P, m(t(k)), m(t(k+1)))}, k = 0, 1, \ldots, nB - 1,$$

where t(0), 41), . . . , t(nB) shall be already mapped with the function tF, see subclause 5.3.3.2.11.1.1, m: N→N is the mapping function which maps the IGF target range into the IGF source range described in subclause 5.3.3.2.11.1.8 and n8 are the number of scale factor bands, see table 94. SFM is a spectral flatness measurement function, described in in subclause 5.3.3.2.11.1.3 and CREST is a crest-factor function described in subclause 5.3.3.2.11.1.4.

If isCelpToTCX is true or was Transient is true, set $$\text{for } k = 0, 1, \ldots, nB - 1 \begin{cases} prevTargetFIR(k) := tmpTarget(k) \\ preSrcFIR(k) := tmpSrc(k) \\ prevTargetIIR(k) := tmpTarget(k) \\ prevSrcFIR(k) := tmpSrc(k) \end{cases}$$

Calculate:

sTarget(k):=min(2.7,tmp(k)+prevTargetFIR(k)+½prevTargetIIR(k)),k=0,1, . . . ,nB−1 and sSrc(k):=min(2.7,tmp(k)+prevSrcFIR(k)+½prevSrcIIR(k)),k=0,1, . . . ,nB−1.

With these vectors calculate:

diffSFM(k):=sSrc(k)−sTarget(k),k=0,1, . . . ,nB−1.

If for k=0,1, . . . , nB−1 diffSFM(k)≤0, or sTarget(k)>0.1, set prevDamp(k):=−1 dampSmooth(k):=1 else calculate the spectral tilt with the function SLOPE, described in subclause 5.3.3.2.11.1.9:

tilt(k):=SLOPE(P,t(k),t(k+1)),k=0,1, . . . ,nB−1.

If for k=0,1, . . . , nB−1 tilt(k)<−threshTilt or else if tilt(k)>threshTilt and k<nB−1, where threshTilt is defined as $$threshTilt := \frac{60}{t(k+1) - t(k)},$$

calculate the SFM on a shifted spectrum:

$$sShift(k) := \frac{SFM(P, t(k) + shift, t(k+1) + shift)}{CREST(P, t(k) + shift, t(k+1) + shift)}$$

with shift defined as $$shift := \frac{sgn(tilt(k))}{2}(t(k+1) - t(k)).$$

If

−threshTilt≤tilt(k)≤threshTilt set sShift(k):=0.

If for k=0,1, . . . , nB−1 sShift(k)>0.04 set the damping factor of the current frame dampCurr to zero in band k:

dampCurr(k):=0.

Otherwise, calculate dampCurr(k) as follows:

$$dampCurr(k) := e^{alpha(k) \ln\left(\frac{sTarget(k)}{sSource(k)}\right)} + beta(k),$$

where alpha is defined as $$alpha(k) := \min\left(\frac{320}{t(k+1)}, 1.25\right)$$

and beta is defined as $$\text{beta}(k) := \begin{cases} 10 + adap - TNR(P, t(k), t(k+1)), & 10 + adap - TNR(P, t(k), t(k+1)) > 0 \\ 0, & \text{else} \end{cases},$$

where TNR is the tonal-to-noise ratio function as described in subclause 5.3.3.2.11.1.10 and adap is defined as $$adap := \frac{t(k+1) - t(k)}{40}.$$

If for k=0,1, ..., nB−1 prevDamp(k)=−1, set prevDamp(k):=max(currDamp(k),0.1).

Calculate the vector of damping factors d of size nB:

d(k):=min(½(currDamp(k)+prevDamp(k))+0.1*dampSmooth(k),1).

Finally, if isTransient is false and the power spectrum P is available, update the filters $$\text{for } k = 0, 1, \ldots, nB-1 \begin{cases} prevTargetFIR(k) := tmpTarget(k) \\ preSrcFIR(k) := tmpSrc(k) \\ prevTargetIIR(k) := sTarget(k) \\ prevSrcIIR(k) := sSrc(k) \end{cases}$$

The names of the values/indices/parameters in the preceding portion are similar to the corresponding parameters/indices/values that have been discussed throughout this specification. Subsequently, several results from listening tests are discussed in the context of FIGS. 11a to 11c.

These listening tests were conducted showing the benefit of damping by comparing items that were coded with enabled damping against items that were coded without.

Figure 11A:
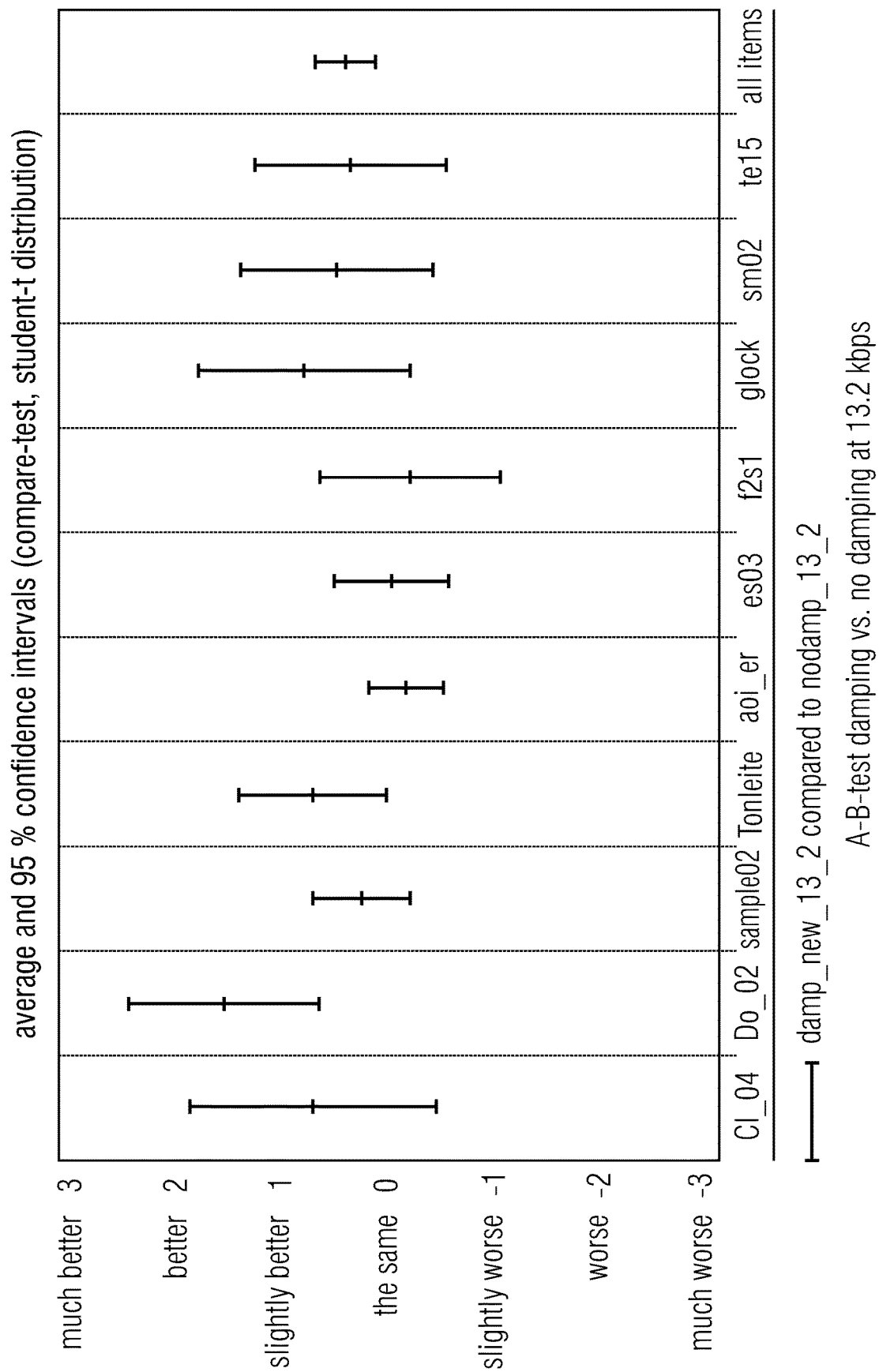
FIGS. 11*a*-11*c* illustrate listening test results obtained from encoding audio data using compensated parameter values.

The first result illustrated in FIG. 11a is an a-B-comparison-test at a bit rate of 13.2 kbps and a sample rate of 32 kHz using mono-items. The results are shown in FIG. 11a showing the a-B-test damping versus no damping at 13.2 kbps.

Figure 11B:
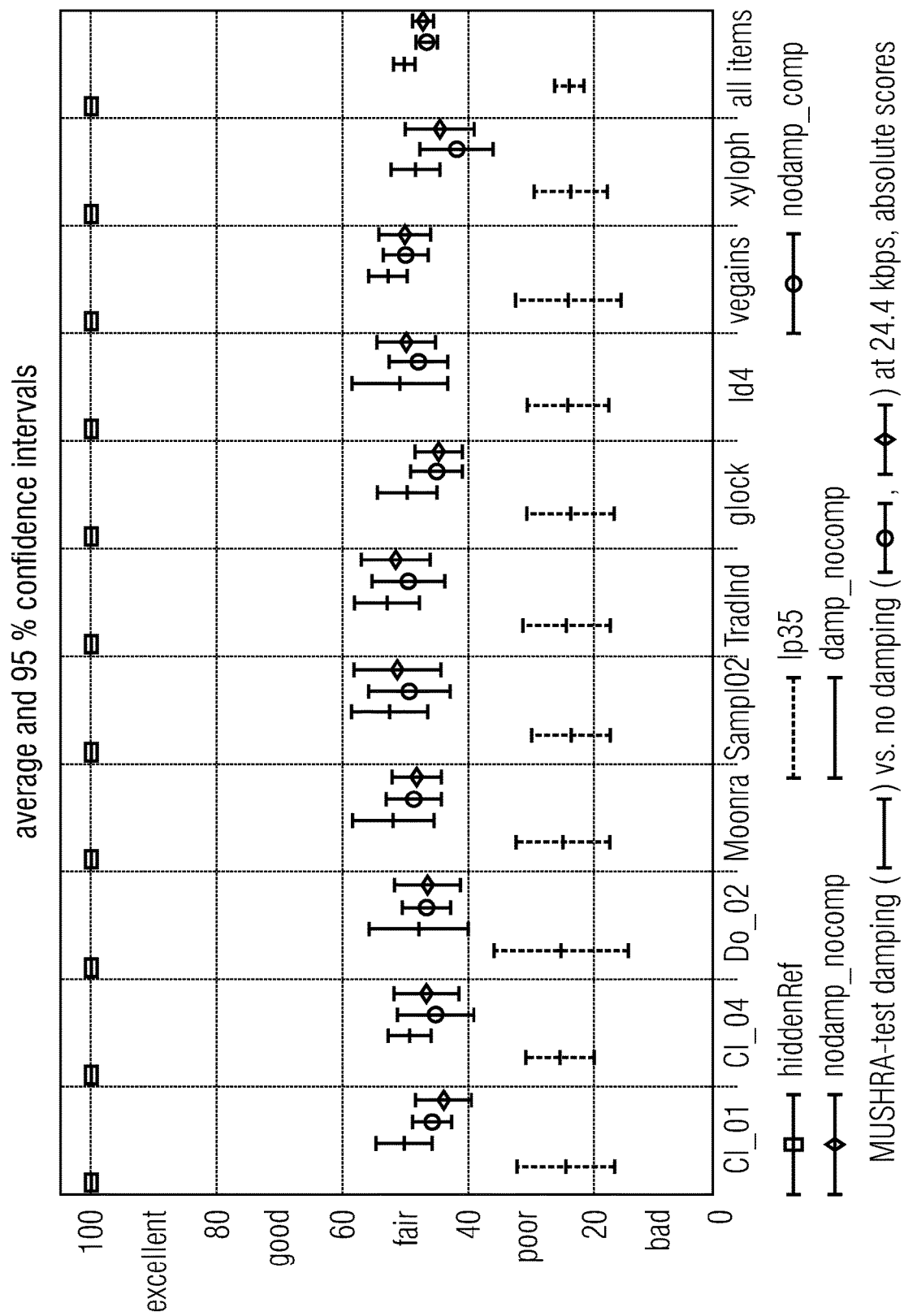
Figure 11C:
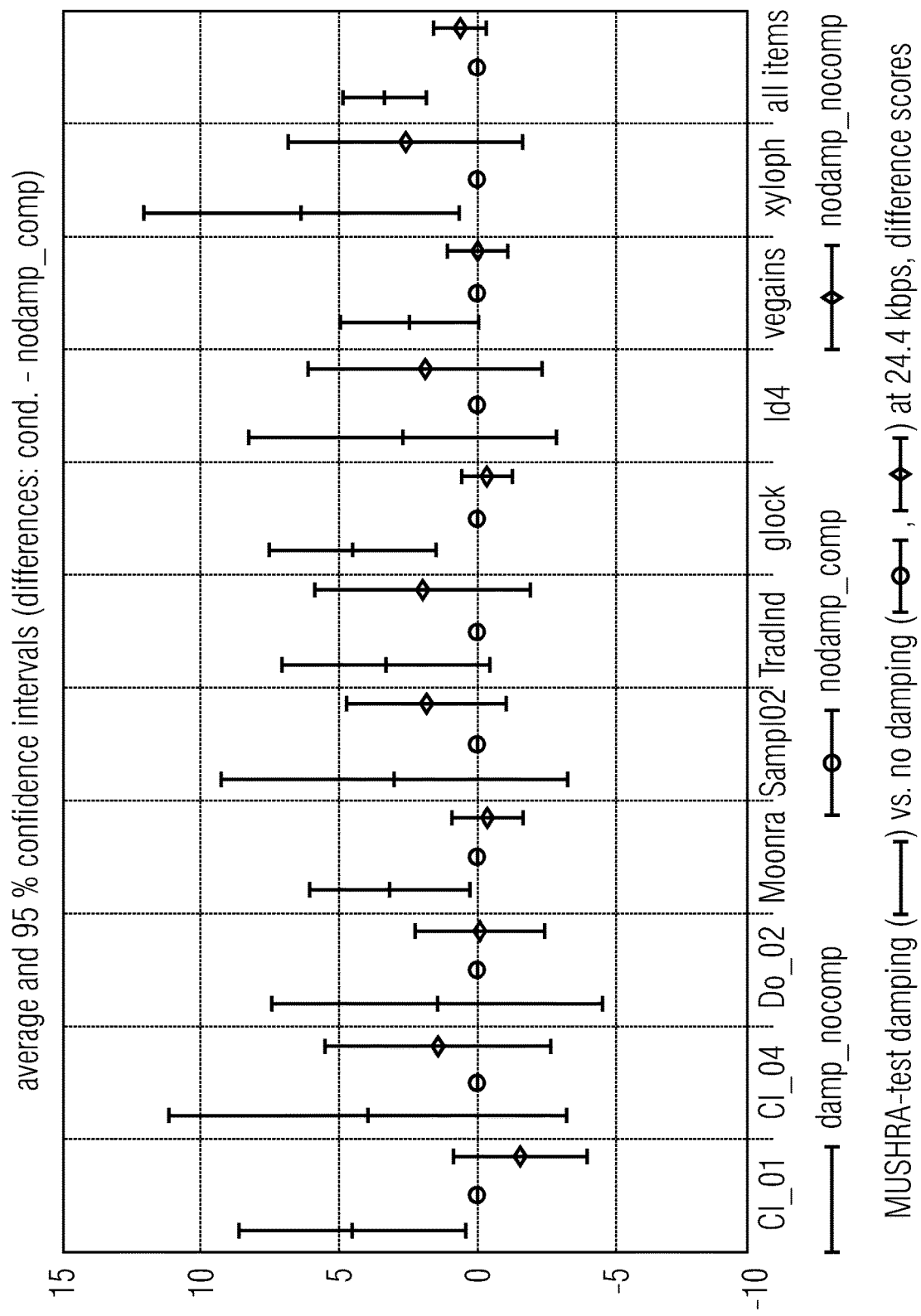

The second one illustrated in FIG. 11b was a MUSHRA-test at 24.4 kbps and a sample rate of 32 kHz using mono-items. Here, two versions without damping were compared to the new version with damping. The results are shown in FIG. 11b (absolute scores) and FIG. 11c (difference scores).

The inventively encoded audio signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio encoder for encoding an audio signal to obtain an encoded audio signal, the audio encoder comprising:
a core encoder configured for core encoding first audio data of the audio signal in a first spectral band to obtain a core-encoded audio signal for the first spectral band;
a parametric coder configured for parametrically coding second audio data of the audio signal in a second spectral band being different from the first spectral band, wherein the parametric coder comprises:
an analyzer configured for analyzing the first audio data in the first spectral band to acquire a first analysis result and for analyzing the second audio data in the second spectral band to acquire a second analysis result, wherein the second spectral band is different from the first spectral band, wherein the analyzer is a part of the audio encoder;
a compensator configured calculating a compensation value using the first analysis result and the second analysis result, wherein the compensator is a part of the audio encoder; and
a parameter calculator configured for calculating a parameter from the second audio data in the second spectral band using the compensation value wherein the parameter calculator is a part of the audio encoder; and
an output interface configured for outputting the encoded audio signal, the encoded audio signal comprising the core-encoded audio data for the first spectral band and the parameter calculated from the second audio data in the second spectral band using the compensation value.

2. The audio encoder of claim 1,
wherein the analyzer is configured to analyze the first audio data using a first calculation rule to obtain a first characteristic of the first audio data as the first analysis result, and to analyze the second audio data in the second spectral band using the first calculation rule to obtain a second characteristic of the second audio data as the second analysis result, and
wherein the parameter calculator is configured for calculating the parameter from the second audio data in the second spectral band by using a second calculation rule being different from the first calculation rule.

3. The audio encoder of claim 2,
wherein the first calculation rule is calculates a spectral fine structure characteristic or an energy distribution characteristic within the first spectral band, or
wherein the second calculation rule calculates an envelope measure or an energy related measure or a power related measure of spectral values within the second spectral band.

4. The audio encoder of claim 1,
wherein the analyzer is configured to calculate a spectral flatness measure, a crest factor or a quotient of the spectral flatness measure and the crest factor for the first spectral band as the first analysis result, and to calculate a spectral flatness measure or a crest factor or a quotient of the spectral flatness measure and the crest factor for the second spectral band as the second analysis result, or
wherein the parameter calculator is configured to calculate, from the second audio data, a spectral envelope information or a gain factor, or
wherein the compensator is configured to calculate the compensation value so that, for a first difference between the first analysis result and the second analysis result, a first compensation value is acquired, and for a second difference between the first analysis result and the second analysis result, a second compensation value is calculated, wherein the first difference is greater than the second difference, and wherein the first compensation value is greater than the second compensation value.

5. The audio encoder of claim 4,
wherein the analyzer is configured to calculate a spectral tilt from the second audio data,
wherein the analyzer is configured to examine whether there is a tonal component close to a border of the second spectral band, and
wherein the parametric coder further comprises a compensation detector, and wherein the compensation detector is configured to determine that the parameter is to be calculated using the compensation value only when the spectral tilt is below a predetermined threshold, or when the spectral tilt is above a predetermined threshold and the examination has determined that there exists a tonal component close to the border.

6. The audio encoder of claim 1,
wherein the core encoder is configured to core encode the audio signal at least in a core band extending until an enhancement start frequency,
wherein the core band comprises the first spectral band and at least one further source band overlapping with the first spectral band,
wherein the audio signal comprises an enhancement range extending from the enhancement start frequency until a maximum frequency, wherein the second spectral band and at least one further target band are included in the enhancement range, wherein the second spectral band and the further target band do not overlap with each other.

7. The audio encoder of claim 6,
wherein the enhancement start frequency is a cross-over frequency and a core encoded signal is band limited to the cross-over frequency, or
wherein the enhancement start frequency is an intelligent gap filling start frequency and a core encoded signal is band-limited to the maximum frequency being greater than the enhancement start frequency.

8. The audio encoder of claim 1,
wherein the analyzer is configured to calculate, as the first analysis result, a first quantitative value, and as the second analysis result, a second quantitative value,
wherein the compensator is configured to calculate a quantitative compensation value from the first quantitative value and from the second quantitative value, and
wherein the parameter calculator is configured for calculating a quantitative parameter using the quantitative compensation value.

9. The audio encoder of claim 1,
wherein the first spectral band and the second spectral band are mutually exclusive to each other,
wherein the analyzer is configured to calculate the first analysis result without using the second audio data in the second spectral band, and to calculate the second analysis result without using the first audio data in the first spectral band.

10. The audio encoder of claim 1,
wherein the audio signal comprises a time sequence of frames,
wherein the compensator is configured to calculate a current compensation value for a current frame using a previous compensation value for a previous frame.

11. The audio encoder of claim 1,
wherein the parametric coder is configured for parametrically coding third audio data in a third spectral band,
wherein the third spectral band comprises higher frequencies than the second spectral band, and
wherein the compensator is configured to use a third weighting value in calculating a compensation value for the third spectral band,
wherein the third weighting value is different from a second weighting value used for calculating a compensation value for the second spectral band.

12. The audio encoder of claim 1, wherein the analyzer is configured to additionally calculate a tonal-to-noise ratio of the second audio data in the second spectral band, and
wherein the compensator is configured to calculate the compensation value dependent on the tonal-to-noise ratio of the second audio data so that a first compensation value is acquired for a first tonal-to-noise ratio or a second compensation value is acquired for a second tonal-to-noise ratio, the first compensation value being greater than the second compensation value, and the first tonal-to-noise ratio being greater than the second tonal-to-noise ratio.

13. The audio encoder of claim 1, wherein the parameter calculator is configured for calculating a non-compensated parameter from the second audio data and for combining the non-compensated parameter and the compensation value to acquire the parameter.

14. The audio encoder of claim 1, wherein the audio signal comprises a time-sequence of frames, and
wherein the analyzer is configured
for analyzing first audio data in the first spectral band of a frame of the time-sequence of frames to acquire the first analysis result, and
for analyzing second audio data of the frame in the second spectral band to acquire a second analysis result for the frame, wherein the compensator is configured for calculating a compensation value for the frame using the first analysis result for the frame and the second analysis result for the frame; and
wherein the parameter calculator is configured for calculating the parameter from the second audio data in the second spectral band of the frame using the compensation value for the frame.

15. The audio encoder of claim 1,
wherein the compensator is configured to determine the compensation value by applying a psychoacoustic model, wherein the psychoacoustic model is configured to evaluate a psychoacoustic mismatch between the first audio data and the second audio data using the first analysis result and the second analysis result to acquire the compensation value.

16. The audio encoder of claim 1,
wherein the audio signal comprises a time-sequence of frames, and
wherein the parametric coder further comprises: a compensation detector for detecting, based on the first analysis result and the second analysis result, whether the parameter for the second spectral band of a frame of the time-sequence of frames is to be calculated either using the compensation value in a compensation situation or without using the compensation value in a non-compensation situation.

17. The audio encoder of claim 1, wherein the parametric coder further comprises a compensation detector, and
wherein the compensation detector is configured to detect a compensation situation, when a difference between the first analysis result and the second analysis result comprises a predetermined situation, or when the second analysis result comprises a predetermined situation,
wherein the compensation detector is configured to detect that a spectral band is not to be compensated, when a power spectrum is not available to the audio encoder or when a current frame is detected to be a transient frame, or
wherein the compensator is configured to calculate the compensation value based on a quotient of the first analysis result and the second analysis result.

18. The audio encoder of claim 1, further comprising:
a decoder for decoding encoded first audio data in the first spectral band to acquire encoded and decoded first audio data,
wherein the analyzer is configured to calculate the first analysis result using the encoded and decoded first audio data, and
to calculate the second analysis result from the second audio data.

19. The audio encoder of claim 1, further comprising:
a patch simulator for simulating a patching result for the second spectral band, the patching result comprising at least one spectral line from the second spectral band included in a core encoded audio signal;
wherein the analyzer is configured to calculate the first analysis result using the first audio data and the at least one spectral line from the second spectral band; and
to calculate the second analysis result from the second audio data.

20. The audio encoder of claim 1,
wherein the core encoder is configured to encode the first audio data in a sequence of real valued spectra,
wherein the analyzer is configured to calculate the first and the second analysis result from a sequence of power spectra,
wherein a power spectrum is calculated from the audio signal or is derived from a real valued spectrum used by the core encoder.

21. The audio encoder of claim 1,
wherein the parameter calculator is configured
to calculate a gain factor for the second spectral band based on the second audio data in the second spectral band,
to calculate a damping factor as the compensation value, and
to multiply the gain factor for the band by the damping factor to acquire a compensated gain factor as the parameter, and
wherein the output interface is configured for outputting the compensated gain factor as the parameter for the second spectral band.

22. An audio encoding method of encoding an audio signal to obtain an encoded audio signal, the audio encoding method comprising:
core encoding first audio data of the audio signal in a first spectral band to obtain a core-encoded audio signal for the first spectral band;
parametrically coding second audio data of the audio signal in a second spectral band being different from the first spectral band, wherein the parametrically coding comprises:
analyzing the first audio data in the first spectral band to acquire a first analysis result and analyzing the second audio data in the second spectral band to acquire a second analysis result, wherein the second spectral band is different from the first spectral band;

calculating a compensation value using the first analysis result and the second analysis result; and calculating a parameter from the second audio data in the second spectral band using the compensation value, and outputting the encoded audio signal, the encoded audio signal comprising the core-encoded audio data for the first spectral band and the parameter calculated from the second audio data in the second spectral band using the compensation value.

23. A system for processing an audio signal, comprising:

an audio encoder configured for encoding the audio signal to obtain an encoded audio signal, the audio encoder comprising:

a core encoder configured for core encoding first audio data of the audio signal in a first spectral band to obtain a core-encoded audio signal for the first spectral band;

a parametric coder configured for parametrically coding second audio data of the audio signal in a second spectral band being different from the first spectral band, wherein the parametric coder comprises:

an analyzer configured for analyzing the first audio data in the first spectral band to acquire a first analysis result and for analyzing the second audio data in the second spectral band to acquire a second analysis result, wherein the second spectral band is different from the first spectral band;

a compensator configured for calculating a compensation value using the first analysis result and the second analysis result; and a parameter calculator configured for calculating a parameter from the second audio data in the second spectral band using the compensation value; and an output interface configured for outputting the encoded audio signal, the encoded audio signal comprising the core-encoded audio data for the first spectral band and the parameter calculated from the second audio data in the second spectral band using the compensation value; and a decoder configured for receiving the encoded audio signal, the encoded audio signal comprising the core-encoded audio data for the first spectral band and the parameter for the second spectral band, wherein the decoder is configured for performing a spectral enhancement operation in order to regenerate synthesized audio data for the second spectral band using the parameter and decoded core-encoded audio data for the first spectral band derived from the core-encoded audio data for the first spectral band.

24. A method of processing an audio signal, comprising:

encoding the audio signal, the encoding comprising:

core encoding first audio data of the audio signal in a first spectral band; to obtain a core-encoded audio signal for the first spectral band parametrically coding second audio data of the audio signal in a second spectral band being different from the first spectral band, wherein the parametrically coding comprises:

analyzing the first audio data in the first spectral band to acquire a first analysis result and analyzing the second audio data in the second spectral band to acquire a second analysis result, wherein the second spectral band is different from the first spectral band;

calculating a compensation value using the first analysis result and the second analysis result; and calculating a parameter from the second audio data in the second spectral band using the compensation value, and outputting the encoded audio signal, the encoded audio signal comprising the core-encoded audio data for the first spectral band and the parameter calculated from the second audio data in the second spectral band using the compensation value;

receiving the encoded audio signal comprising the core-encoded audio data for the first spectral band and the parameter for the second spectral band; and performing a spectral enhancement operation in order to regenerate synthesized audio data for the second spectral band using the parameter and decoded core-encoded audio data for the first spectral band derived from the core-encoded audio data for the first spectral band.

25. A non-transitory digital storage medium having computer-readable code stored thereon to perform, when the computer-readable code is run by a computer, a method of encoding an audio signal, the method comprising:

core encoding first audio data of the audio signal in a first spectral band to obtain a core-encoded audio signal for the first spectral band;

parametrically coding second audio data of the audio signal in a second spectral band being different from the first spectral band, wherein the parametrically coding comprises:

analyzing the first audio data in the first spectral band to acquire a first analysis result and analyzing the second audio data in the second spectral band to acquire a second analysis result, wherein the second spectral band is different from the first spectral band;

calculating a compensation value using the first analysis result and the second analysis result; and calculating a parameter from the second audio data in the second spectral band using the compensation value, and outputting the encoded audio signal, the encoded audio signal comprising the core-encoded audio data for the first spectral band and the parameter calculated from the second audio data in the second spectral band using the compensation value.

26. A non-transitory digital storage medium having computer-readable code stored thereon to perform, when the computer-readable code is run by a computer, a method of processing an audio signal, the method comprising:

encoding the audio signal, the encoding comprising:

core encoding first audio data of the audio signal in a first spectral band to obtain a core-encoded audio signal for the first spectral band;

parametrically coding second audio data of the audio signal in a second spectral band being different from the first spectral band, wherein the parametrically coding comprises:

analyzing the first audio data in the first spectral band to acquire a first analysis result and analyzing the second audio data in the second spectral band to acquire a second analysis result, wherein the second spectral band is different from the first spectral band;

calculating a compensation value using the first analysis result and the second analysis result; and calculating a parameter from the second audio data in the second spectral band using the compensation value, and outputting the encoded audio signal, the encoded audio signal comprising the core-encoded audio data for the first spectral band and the parameter calculated from the second audio data in the second spectral band using the compensation value;

receiving the encoded audio signal comprising the encoded core-encoded audio data for the first spectral band and the parameter for the second spectral band; and performing a spectral enhancement operation in order to regenerate synthesized audio data for the second spectral band using the parameter and core-decoded audio data for the first spectral band derived from the core-encoded audio data for the first spectral band.

\* \* \* \* \*